US012471935B2

(12) United States Patent
Canepa et al.

(10) Patent No.: US 12,471,935 B2
(45) Date of Patent: Nov. 18, 2025

(54) SELF LEVELING PATELLAR DRILL GUIDE

(71) Applicant: Howmedica Osteonics Corp., Mahwah, NJ (US)

(72) Inventors: Polina Canepa, Wyckoff, NJ (US); Elena Doce, Sleepy Hollow, NY (US); Stefano Bini, Piedmont, CA (US)

(73) Assignee: Howmedica Osteonics Corp., Mahwah, NJ (US)

( * ) Notice: Subject to any disclaimer, the term of this patent is extended or adjusted under 35 U.S.C. 154(b) by 201 days.

(21) Appl. No.: 18/227,010

(22) Filed: Jul. 27, 2023

(65) Prior Publication Data

US 2024/0032947 A1 Feb. 1, 2024

Related U.S. Application Data

(60) Provisional application No. 63/392,616, filed on Jul. 27, 2022.

(51) Int. Cl.
*A61B 17/17* (2006.01)
*A61B 17/16* (2006.01)

(52) U.S. Cl.
CPC ...... *A61B 17/1767* (2013.01); *A61B 17/1677* (2013.01)

(58) Field of Classification Search
CPC .............. A61B 17/158; A61B 17/1667; A61B 17/1767
See application file for complete search history.

(56) References Cited

U.S. PATENT DOCUMENTS

| 3,801,989 | A | * | 4/1974 | McKee | A61F 2/4607 |
| | | | | | 606/86 R |
| 3,806,961 | A | | 4/1974 | Muller | |
| 3,878,566 | A | | 4/1975 | Bechtol | |
| 3,927,423 | A | | 12/1975 | Swanson | |
| 3,964,106 | A | | 6/1976 | Hutter, Jr. et al. | |
| 4,007,495 | A | | 2/1977 | Frazier | |
| 4,041,550 | A | | 8/1977 | Frazier | |
| 4,094,017 | A | | 6/1978 | Matthews et al. | |
| 4,151,615 | A | | 5/1979 | Hall | |
| 4,158,894 | A | | 6/1979 | Worrell | |
| 4,240,162 | A | | 12/1980 | Devas | |

(Continued)

FOREIGN PATENT DOCUMENTS

| DE | 3332354 A1 | 3/1985 |
| DE | 4221006 A1 | 1/1994 |

(Continued)

OTHER PUBLICATIONS

Stryker Orthopaedics "Triathlon Knee System Surgical Protocol-Posterior Stabilized & Cruciate Retaining" Copyright © 2006 Stryker, pp. 1-78.

(Continued)

*Primary Examiner* — Matthew J Lawson
(74) *Attorney, Agent, or Firm* — Lerner David LLP

(57) ABSTRACT

A patella drill guide includes a head having a convexly curved outer surface. Cylindrical channels extend through the head. The drill guide also includes collar having an inner surface that defines a concavity corresponding in shape to the convexly curved outer surface. The inner surface of the collar is fitted to the outer surface of the head to define an articular joint.

19 Claims, 17 Drawing Sheets

(56) References Cited

U.S. PATENT DOCUMENTS

| | | |
|---|---|---|
| 4,285,070 A | 8/1981 | Averill |
| 4,309,778 A | 1/1982 | Buechel et al. |
| 4,340,978 A | 7/1982 | Buechel et al. |
| 4,344,192 A | 8/1982 | Imbert |
| 4,457,306 A * | 7/1984 | Borzone ............ A61F 2/4637 81/421 |
| 4,479,271 A | 10/1984 | Bolesky et al. |
| 4,633,862 A * | 1/1987 | Petersen ............ A61B 17/2812 606/88 |
| 4,650,490 A | 3/1987 | Figgie, III |
| 4,706,660 A | 11/1987 | Petersen |
| 4,888,021 A | 12/1989 | Forte et al. |
| 4,944,756 A | 7/1990 | Kenna |
| 4,964,867 A | 10/1990 | Boger |
| 4,979,957 A | 12/1990 | Hodorek |
| 4,997,445 A | 3/1991 | Hodorek |
| 5,011,496 A | 4/1991 | Forte et al. |
| 5,019,104 A | 5/1991 | Whiteside et al. |
| 5,021,055 A * | 6/1991 | Burkinshaw ......... A61B 17/158 606/88 |
| 5,021,061 A | 6/1991 | Wevers et al. |
| 5,035,700 A | 7/1991 | Kenna |
| 5,129,908 A | 7/1992 | Petersen |
| 5,133,758 A | 7/1992 | Hollister |
| 5,180,384 A | 1/1993 | Mikhail |
| 5,181,924 A | 1/1993 | Gschwend et al. |
| 5,197,986 A | 3/1993 | Mikhail |
| 5,222,955 A | 6/1993 | Mikhail |
| 5,236,462 A | 8/1993 | Mikhail |
| 5,246,460 A | 9/1993 | Goodfellow et al. |
| 5,330,532 A | 7/1994 | Ranawat |
| 5,358,529 A | 10/1994 | Davidson |
| 5,383,937 A | 1/1995 | Mikhail |
| 5,395,401 A | 3/1995 | Bahler |
| 5,425,775 A | 6/1995 | Kovacevic et al. |
| 5,480,443 A | 1/1996 | Elias |
| 5,514,183 A | 5/1996 | Epstein et al. |
| 5,522,901 A | 6/1996 | Thomas et al. |
| 5,580,353 A | 12/1996 | Mendes et al. |
| 5,593,450 A | 1/1997 | Scott et al. |
| 5,609,640 A | 3/1997 | Johnson |
| 5,609,644 A | 3/1997 | Ashby et al. |
| 5,624,462 A | 4/1997 | Bonutti |
| 5,702,465 A | 12/1997 | Burkinshaw |
| 5,702,467 A | 12/1997 | Gabriel et al. |
| 5,716,360 A * | 2/1998 | Baldwin ............ A61B 17/1767 606/88 |
| 5,723,016 A | 3/1998 | Minns et al. |
| 5,725,584 A | 3/1998 | Walker et al. |
| 5,728,162 A | 3/1998 | Eckhoff |
| 5,871,539 A | 2/1999 | Pappas |
| 5,871,540 A | 2/1999 | Weissman et al. |
| 5,871,541 A | 2/1999 | Gerber |
| 5,941,884 A * | 8/1999 | Corvelli ............ A61B 17/1767 606/88 |
| 5,989,472 A | 11/1999 | Ashby et al. |
| 6,010,509 A * | 1/2000 | Delgado ............ A61F 2/461 606/88 |
| 6,102,955 A | 8/2000 | Mendes et al. |
| 6,146,423 A | 11/2000 | Cohen et al. |
| 6,190,391 B1 | 2/2001 | Stubbs |
| 6,190,415 B1 | 2/2001 | Cooke et al. |
| 6,217,617 B1 | 4/2001 | Bonutti |
| 6,315,798 B1 | 11/2001 | Ashby et al. |
| 6,506,193 B1 | 1/2003 | Stubbs |
| 6,602,292 B2 | 8/2003 | Burkinshaw |
| 6,616,696 B1 | 9/2003 | Merchant |
| 6,709,460 B2 | 3/2004 | Merchant |
| 6,800,094 B2 | 10/2004 | Burkinshaw |
| 6,802,864 B2 | 10/2004 | Tornier |
| 6,846,329 B2 | 1/2005 | McMinn |
| 6,855,150 B1 | 2/2005 | Linehan |
| 6,916,341 B2 | 7/2005 | Rolston |
| 7,208,222 B2 | 4/2007 | Rolfe et al. |
| 7,258,701 B2 | 8/2007 | Aram et al. |
| 7,476,250 B1 | 1/2009 | Mansmann |
| 7,517,365 B2 | 4/2009 | Carignan et al. |
| 7,572,295 B2 | 8/2009 | Steinberg |
| 7,691,149 B2 | 4/2010 | Brown et al. |
| 7,713,305 B2 | 5/2010 | Ek |
| 7,749,276 B2 | 7/2010 | Fitz |
| 7,758,651 B2 | 7/2010 | Chauhan et al. |
| 7,806,896 B1 | 10/2010 | Bonutti |
| 7,837,736 B2 | 11/2010 | Bonutti |
| 7,972,383 B2 | 7/2011 | Goldstein et al. |
| 8,002,839 B2 | 8/2011 | Rochetin et al. |
| 8,062,302 B2 | 11/2011 | Lang et al. |
| 8,092,544 B2 | 1/2012 | Wright et al. |
| 8,105,330 B2 | 1/2012 | Fitz et al. |
| 8,133,233 B2 | 3/2012 | Fitz |
| 8,142,509 B2 | 3/2012 | McKinnon et al. |
| 8,182,542 B2 | 5/2012 | Ferko |
| 8,216,319 B2 | 7/2012 | Rhodes |
| 8,226,725 B2 | 7/2012 | Ferko |
| 8,268,005 B2 | 9/2012 | Brown et al. |
| 8,282,685 B2 | 10/2012 | Rochetin et al. |
| 8,337,501 B2 | 12/2012 | Fitz et al. |
| 8,460,392 B2 | 6/2013 | Wright et al. |
| 8,506,639 B2 | 8/2013 | Hayden et al. |
| 8,545,569 B2 | 10/2013 | Fitz et al. |
| 8,556,982 B2 | 10/2013 | Wright et al. |
| 8,585,708 B2 | 11/2013 | Fitz et al. |
| 8,632,552 B2 | 1/2014 | Bonutti |
| 8,657,827 B2 | 2/2014 | Fitz et al. |
| 8,682,052 B2 | 3/2014 | Fitz et al. |
| 8,690,945 B2 | 4/2014 | Fitz et al. |
| 8,696,754 B2 | 4/2014 | Cuckler et al. |
| 8,747,478 B2 | 6/2014 | Ries et al. |
| 8,808,386 B2 | 8/2014 | Engh et al. |
| 8,814,946 B2 | 8/2014 | Steinberg |
| 8,834,574 B2 | 9/2014 | Todd et al. |
| 8,888,858 B2 | 11/2014 | Brown et al. |
| 8,945,135 B2 | 2/2015 | Ries et al. |
| 8,961,529 B2 | 2/2015 | Carignan et al. |
| 8,986,306 B2 | 3/2015 | Wright et al. |
| 9,023,050 B2 | 5/2015 | Lang et al. |
| 9,078,676 B2 | 7/2015 | Randle et al. |
| 9,078,772 B2 | 7/2015 | Jones et al. |
| 9,107,680 B2 | 8/2015 | Fitz et al. |
| 9,125,749 B2 | 9/2015 | Amirouche et al. |
| 9,138,241 B2 | 9/2015 | Kuczynski |
| 9,138,322 B2 | 9/2015 | Wright et al. |
| 9,180,015 B2 | 11/2015 | Fitz et al. |
| 9,186,161 B2 | 11/2015 | Lang et al. |
| 9,186,254 B2 | 11/2015 | Fitz et al. |
| 9,289,305 B2 | 3/2016 | Dacus |
| 9,314,342 B2 | 4/2016 | Andriacchi et al. |
| 9,333,085 B2 | 5/2016 | Fitz et al. |
| 9,381,085 B2 | 7/2016 | Axelson, Jr. et al. |
| 9,393,124 B2 | 7/2016 | Angibaud |
| 9,486,321 B1 | 11/2016 | Smith et al. |
| 9,498,342 B2 | 11/2016 | Wright et al. |
| 9,554,813 B2 | 1/2017 | Clever et al. |
| 9,572,672 B2 | 2/2017 | Sharkey |
| 11,026,796 B2 | 6/2021 | Mistry et al. |
| 2001/0023371 A1 | 9/2001 | Bonutti |
| 2002/0058948 A1* | 5/2002 | Arlettaz ............ A61B 17/1725 606/98 |
| 2003/0033018 A1 | 2/2003 | Merchant |
| 2003/0083751 A1 | 5/2003 | Tornier |
| 2003/0088315 A1 | 5/2003 | Supinski |
| 2003/0120346 A1 | 6/2003 | Mercinek et al. |
| 2003/0181984 A1 | 9/2003 | Abendschein |
| 2004/0143336 A1 | 7/2004 | Burkinshaw |
| 2004/0143338 A1 | 7/2004 | Burkinshaw et al. |
| 2004/0162561 A1* | 8/2004 | Marchyn ............ A61B 17/1677 606/78 |
| 2004/0236428 A1 | 11/2004 | Burkinshaw et al. |
| 2004/0247641 A1 | 12/2004 | Felt et al. |
| 2004/0254645 A1 | 12/2004 | Arnin et al. |
| 2005/0143830 A1 | 6/2005 | Marcinek et al. |
| 2005/0143833 A1 | 6/2005 | Merchant |
| 2005/0171612 A1 | 8/2005 | Rolston |

(56) References Cited

U.S. PATENT DOCUMENTS

| | | |
|---|---|---|
| 2005/0246028 A1 | 11/2005 | Pappas et al. |
| 2006/0052792 A1 | 3/2006 | Boettiger et al. |
| 2007/0100447 A1 | 5/2007 | Steinberg |
| 2007/0100460 A1 | 5/2007 | Rhodes |
| 2007/0100461 A1 | 5/2007 | Incavo et al. |
| 2007/0100462 A1 | 5/2007 | Lang et al. |
| 2007/0123991 A1 | 5/2007 | Steinberg |
| 2007/0162142 A1 | 7/2007 | Stone |
| 2007/0173858 A1 | 7/2007 | Engh et al. |
| 2008/0243258 A1 | 10/2008 | Sancheti |
| 2009/0005708 A1 | 1/2009 | Johanson et al. |
| 2009/0036993 A1 | 2/2009 | Metzger |
| 2009/0222103 A1 | 9/2009 | Fitz et al. |
| 2009/0259317 A1 | 10/2009 | Steinberg |
| 2010/0070046 A1 | 3/2010 | Steinberg |
| 2010/0160915 A1 | 6/2010 | Chauhan et al. |
| 2010/0174379 A1 | 7/2010 | McMinn |
| 2010/0280624 A1 | 11/2010 | Engh et al. |
| 2010/0312342 A1 | 12/2010 | Ek |
| 2011/0144760 A1 | 6/2011 | Wong et al. |
| 2011/0224801 A1 | 9/2011 | Mansmann |
| 2012/0010623 A1 | 1/2012 | Bonutti |
| 2012/0059485 A1 | 3/2012 | Roger |
| 2012/0116525 A1 | 5/2012 | Brown et al. |
| 2012/0136451 A1 | 5/2012 | Fitz |
| 2012/0165821 A1 | 6/2012 | Carignan et al. |
| 2012/0197408 A1 | 8/2012 | Lang et al. |
| 2012/0209393 A1 | 8/2012 | Ries et al. |
| 2012/0209395 A1 | 8/2012 | Tepic et al. |
| 2012/0245699 A1 | 9/2012 | Lang et al. |
| 2013/0165939 A1* | 6/2013 | Ries ................ A61B 17/1677 606/88 |
| 2013/0166035 A1 | 6/2013 | Landon |
| 2013/0226185 A1 | 8/2013 | Bonutti |
| 2014/0094813 A1 | 4/2014 | Clever et al. |
| 2014/0094819 A1 | 4/2014 | Clever et al. |
| 2014/0128973 A1 | 5/2014 | Howard et al. |
| 2014/0142713 A1 | 5/2014 | Wright et al. |
| 2014/0142714 A1 | 5/2014 | Wright et al. |
| 2014/0228964 A1 | 8/2014 | Lew et al. |
| 2014/0277523 A1 | 9/2014 | Masini et al. |
| 2014/0358241 A1 | 12/2014 | Afriat |
| 2015/0005772 A1* | 1/2015 | Anglin ............... A61B 17/1767 434/262 |
| 2015/0196325 A1 | 7/2015 | Shenoy et al. |
| 2016/0030182 A1 | 2/2016 | McMinn |
| 2016/0045321 A1 | 2/2016 | Gabriel et al. |
| 2016/0081758 A1 | 3/2016 | Bonutti |
| 2016/0192878 A1 | 7/2016 | Hunter |
| 2016/0206331 A1 | 7/2016 | Fitz et al. |
| 2016/0235541 A1 | 8/2016 | Samuelson et al. |
| 2016/0242915 A1 | 8/2016 | Samuelson et al. |
| 2016/0242916 A1 | 8/2016 | Samuelson et al. |
| 2016/0242918 A1 | 8/2016 | Samuelson et al. |
| 2016/0242919 A1 | 8/2016 | Engh et al. |
| 2016/0256280 A1 | 9/2016 | Trauner |
| 2016/0256283 A1 | 9/2016 | Samuelson et al. |
| 2016/0256284 A1 | 9/2016 | Fitz et al. |
| 2016/0278794 A1 | 9/2016 | Boldt et al. |
| 2016/0324646 A1 | 11/2016 | Carignan et al. |
| 2016/0367373 A1 | 12/2016 | Samuelson et al. |
| 2017/0007414 A1 | 1/2017 | Fitz et al. |
| 2018/0193168 A1* | 7/2018 | Termanini ............. A61F 2/4637 |
| 2020/0138457 A1* | 5/2020 | Lorean ................ A61B 17/17 |
| 2022/0117613 A1* | 4/2022 | Collazo ............. A61B 17/158 |
| 2023/0404598 A1* | 12/2023 | Steeven ............ A61B 17/1767 |

FOREIGN PATENT DOCUMENTS

| | | |
|---|---|---|
| EP | 0307654 A2 | 3/1989 |
| EP | 0437173 A1 | 7/1991 |
| EP | 0676182 A1 | 10/1995 |
| EP | 1308142 A2 | 5/2003 |
| EP | 2471494 A1 | 7/2012 |
| EP | 2572678 A1 | 3/2013 |
| EP | 2675399 A1 | 12/2013 |
| EP | 2712588 A1 | 4/2014 |
| FR | 2440185 A1 | 5/1980 |
| FR | 2615096 A1 | 11/1988 |
| FR | 2642301 A1 | 8/1990 |
| FR | 2652497 A1 | 4/1991 |
| FR | 2682590 A1 | 4/1993 |
| FR | 2700260 A1 | 7/1994 |
| FR | 2746632 A1 | 10/1997 |
| FR | 2884408 A1 | 10/2006 |
| FR | 2976176 A1 | 12/2012 |
| FR | 2997625 A1 | 5/2014 |
| GB | 1522497 A | 8/1978 |
| GB | 2301032 A | 11/1996 |
| GB | 2433698 A | 7/2007 |
| GB | 2461149 A | 12/2009 |
| JP | 5465475 B2 | 4/2014 |
| WO | 9300871 A1 | 1/1993 |
| WO | 9522303 A2 | 8/1995 |
| WO | 9725006 A1 | 7/1997 |
| WO | 03068119 A2 | 8/2003 |
| WO | 2014159919 A1 | 10/2014 |
| WO | 2016026007 A1 | 2/2016 |

OTHER PUBLICATIONS

Stryker Orthopaedics "AvonTM Patello-Femoral Arthroplasty Surgical Protocol" Copyright © 2004 Stryker, pp. 1-13.

Stryker Orthopaedics "Triathlon Knee System Surgical Protocol-Posterior Stabilized & Cruciate Retaining" Copyright © 2015 Stryker, pp. 1-46.

* cited by examiner

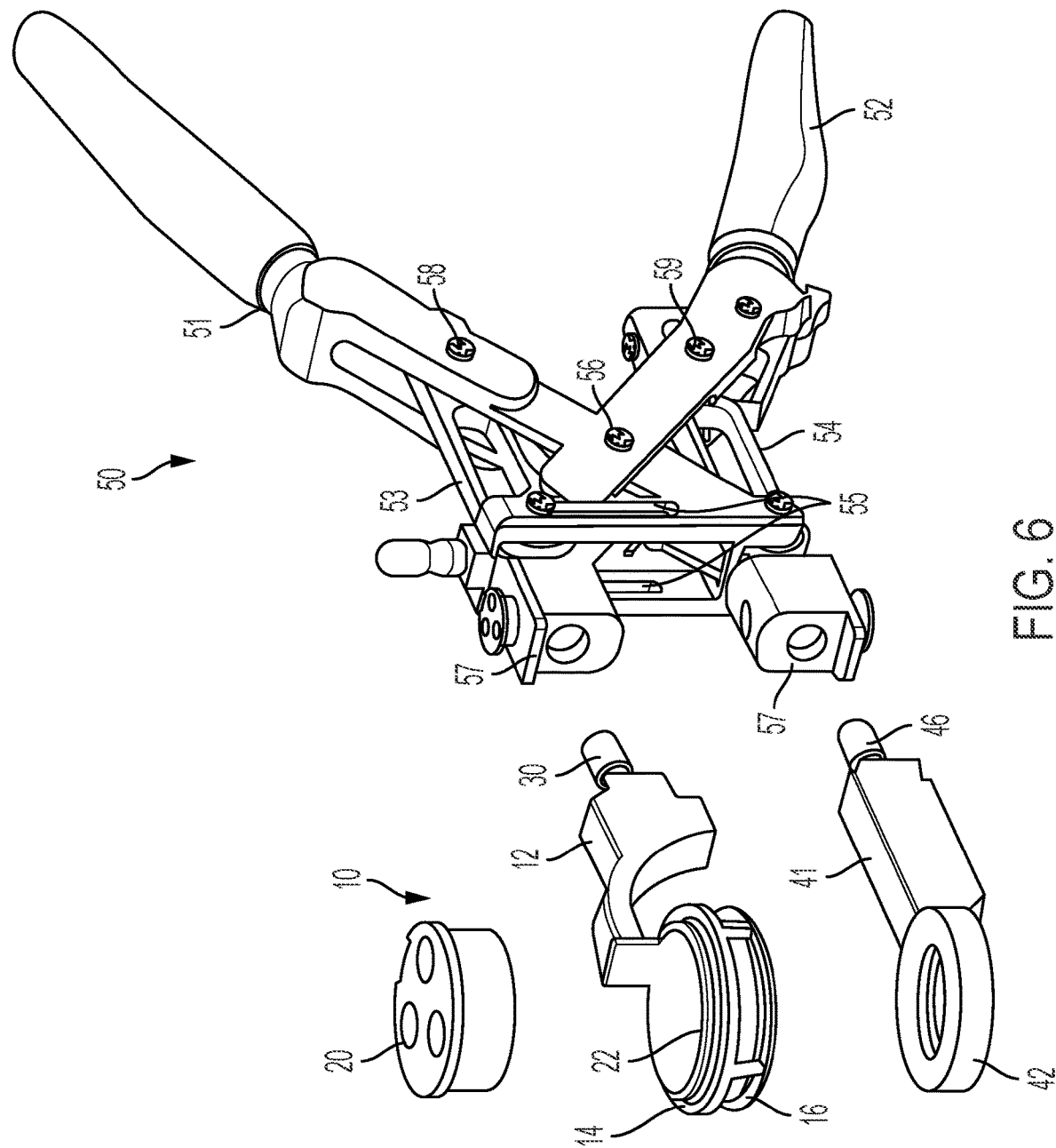

SELF LEVELING PATELLAR DRILL GUIDE

CROSS-REFERENCE TO RELATED APPLICATIONS

The present application claims the benefit of U.S. Provisional Patent Application No. 63/392,616, filed Jul. 27, 2022, the disclosure of which is hereby incorporated herein by reference.

BACKGROUND

Certain treatments for the knee, such as some knee replacements for treating osteoarthritis, include removing a natural articular surface of the patella and replacing the removed articular surface with an implant attached to the patella. Such implants, sometimes referred to as patella buttons, typically include a flat mating surface to be placed on a surface created on the patella by resection. Such implants typically also include pegs extending normally from the mating surface which can be press-fit into holes drilled in the patella. Preparing a patella for a patellar implant therefore usually includes cutting along a plane to create a new planar surface on the patella and drilling holes into that new planar surface.

Aligning a planar cut to anatomical features on the patella can be difficult, meaning the angle of the new planar surface created by the resection will vary between operations. However, most patellar implants are designed on the assumption that the planar surface on which they will be implanted will extend at a certain angle relative to natural anatomical landmarks on the patella. Thus, even after trialling, in some instances the available patellar implants may be poorly suited to the angle of the cut made to the patella. This issue can be compounded by the difficulty of discovering the unfavorable angle of the resection before a trial implant is placed on the patella, by which time holes for the pegs will likely have already been drilled into the patella normal to the resection plane, limiting the possibility of additional corrective resections to make the patella suitable for the available implants. Such difficulties can result in increased operation times and impaired post-operative mechanical function of the knee.

BRIEF SUMMARY

According to some aspects, a drill guide may include a head and a supporting element rotatable about the head. Holes may extend through the head for guiding a drill. The rotatable element may extend beyond the head to define a flat surface lying on a plane through which central axes of the guide holes pass so that the flat surface of the rotatable element may lie flat against a flat surface of another object without the head contacting the other object. The rotatable element may be rotatable about the head to vary an angle between a plane on which the flat surface is defined and central axes of the holes. The rotatable element therefore enables contact to be made between the drill guide and the patella, with a flat surface of the drill guide lying flat on a flat surface of the patella, while the angle between the guide holes and anatomical landmarks on the patella remains independent of the angle of the flat surface of the patella relative to those same anatomical landmarks. The flat surface of the rotatable element may surround an opening extending through the rotatable element, and there may be a range of possible positions of the rotatable element about the head wherein the central axes of the guide holes extend through the opening. The patella may therefore be clamped between the drill guide and a base in a position independent of the angle of the flat surface of the patella, and holes may be drilled into the flat surface of the patella through the drill guide at angles independent of the angle of the flat surface of the patella. The position of the rotatable element relative to the head while the patella is clamped may provide an easily visible indicator of an angle of the flat surface of the patella relative to anatomical landmarks of the patella when the patella is clamped between the drill guide and the base.

The rotatable element may be a collar with an inner surface that corresponds in shape to a portion of a sphere, and the head of the drill guide may include a bearing end having an outer surface that defines a portion of a sphere. The collar may therefore receive the bearing end to form a ball and socket joint. The guide holes in the head may be defined through an insert that is removably received in a bore of the head. The drill guide may be provided along with tools for correcting the angle of the flat surface of the patella relative to anatomical landmarks of the patella, such as a resection guide attachable to the drill guide or a reamer that may be guided by the bore or holes drilled in the patella.

According to another aspect, a patellar drill guide may comprise a head having an outer surface, the outer surface being convexly curved, and at least one channel extending through the head. The patellar drill guide may also comprise a collar having an inner surface being concavely curved and corresponding in shape to at least a portion of the outer surface of the head and being fitted to the head to define an articular joint therebetween.

In some arrangements according to any of the foregoing, the head may comprise a bore and an insert, the insert defining the at least one channel and being removably received within the bore of the head.

In some arrangements according to any of the foregoing, the bore may have an internal diameter at least as great as an external diameter of the cutting end.

In some arrangements according to any of the foregoing, the collar may include a first planar surface and a second planar surface, and the inner surface is defined between the first planar surface and the second planar surface.

In some arrangements according to any of the foregoing, the head may comprise a marking on the outer surface with which the second planar surface is coplanar when the first planar surface is normal to central axes of the channels.

In some arrangements according to any of the foregoing, the drill guide may comprise multiple angle markings offset from the linear marking and with which the second surface may become aligned when the first planar surface is not normal the central axes of the channels.

In some arrangements according to any of the foregoing, the collar may include at least one window through which a portion of the outer surface of the head is visible.

In some arrangements according to any of the foregoing, the head may comprise a projection limiting rotation of the collar about the head.

According to some aspects, a tool may comprise the drill guide of any of the foregoing arrangements. The tool may also comprise a base for supporting a patella. The tool may also comprise a handle comprising levers operable to move the guide and the base in relative to each other.

In some arrangements according to any of the foregoing, either or both of the drill guide and the base may be releasably connected to the levers.

In some arrangements according to any of the foregoing, the base may include a ring-shaped block.

In some arrangements according to any of the foregoing, the handles may be operable to move the drill guide and the base in parallel directions without causing the drill guide and the base to rotate relative to one another.

According to some aspects, a kit may comprise the drill guide or tool of any of the foregoing arrangements. The kit may also comprise a cut guide including a planar guide surface and may be removably connectable to the head at a position where the planar guide surface is normal to the central axes of the channels.

In some arrangements according to any of the foregoing, the cut guide may be adjustable to cause the planar guide surface to translate parallel to the central axes of the channels.

In some arrangements according to any of the foregoing, the outer surface and inner surface of the respective head and collar may be spherical.

According to some aspects, method of preparing a patella for receiving a patellar implant may comprise clamping the patella between a drill guide and a base, the drill guide including a bearing end and a collar forming a ball-and-socket joint, so that the drill guide contacts the patella through the collar on a resection surface created by a resection of a portion of the patella.

In some examples according to any of the foregoing, the method may comprise cutting the patella to remove the resection surface.

In some examples according to any of the foregoing, the method may comprise drilling holes in the patella through the drill guide between clamping the patella and cutting the patella to remove the resection surface.

In some examples according to any of the foregoing, the method of drilling may be performed by directing a drill through holes in a removable insert received in a bore of the drill guide and cutting the patella to remove the resection surface includes directing a reamer through the bore.

In some examples according to any of the foregoing, the method may comprise cutting the patella to remove the resection surface and includes directing a reamer against the patella while a peg extending from a cutting face of the reamer is received in one of the holes drilled in the patella.

In some examples according to any of the foregoing, the method may comprise attaching a corrective resection guide to the drill guide and wherein cutting the patella to remove the resection surface includes directing a cutting tool along a resection guide surface of the corrective resection guide.

BRIEF DESCRIPTION OF THE DRAWINGS

FIG. 6 is an exploded view of a clamping tool that includes the patellar drill guide and base of FIG. 3A.

DETAILED DESCRIPTION

As used herein, the term "proximal," when used in connection with a surgical tool or device, or components of a device, refers to the end of the device closer to the user of the device when the device is being used as intended. On the other hand, the term "distal," when used in connection with a surgical tool or device, or components of a device, refers to the end of the device farther away from the user when the device is being used as intended. As used herein, the terms "substantially," "generally," "approximately," and "about" are intended to mean that slight deviations from absolute are included within the scope of the term so modified, such as deviations of up to 10% greater or lesser than absolute. All vertical directional terms, such as "up," "down," "above," "below," "vertical," or "height" used in the following description refer only to the orientation of features as depicted in the figure being described. Such directional terms are not intended to suggest that any features of the devices described herein must exist in any particular orientation when constructed.

Figure 1A:
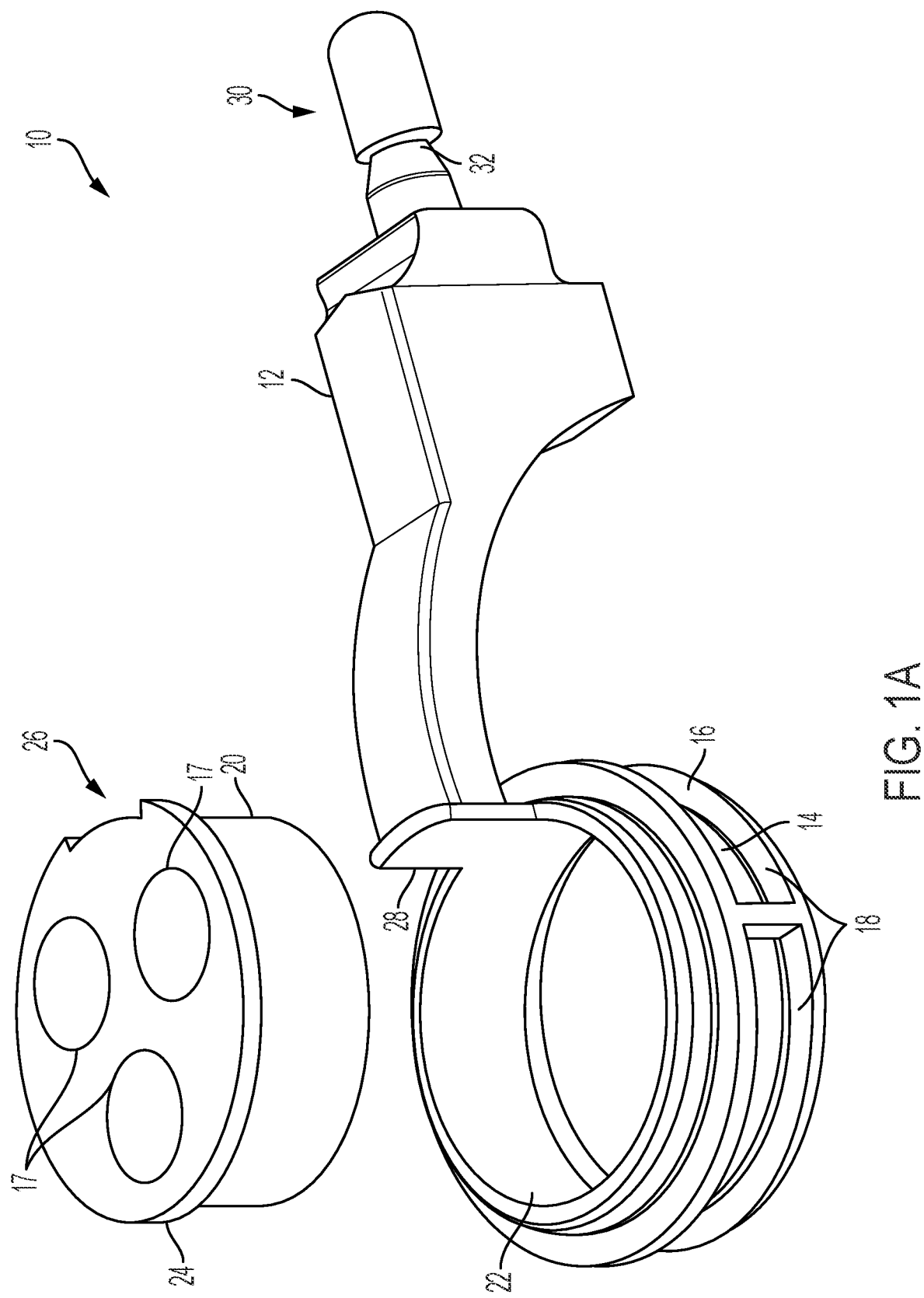
FIG. 1A is an exploded perspective view of a patellar drill guide.
Figure 1B:
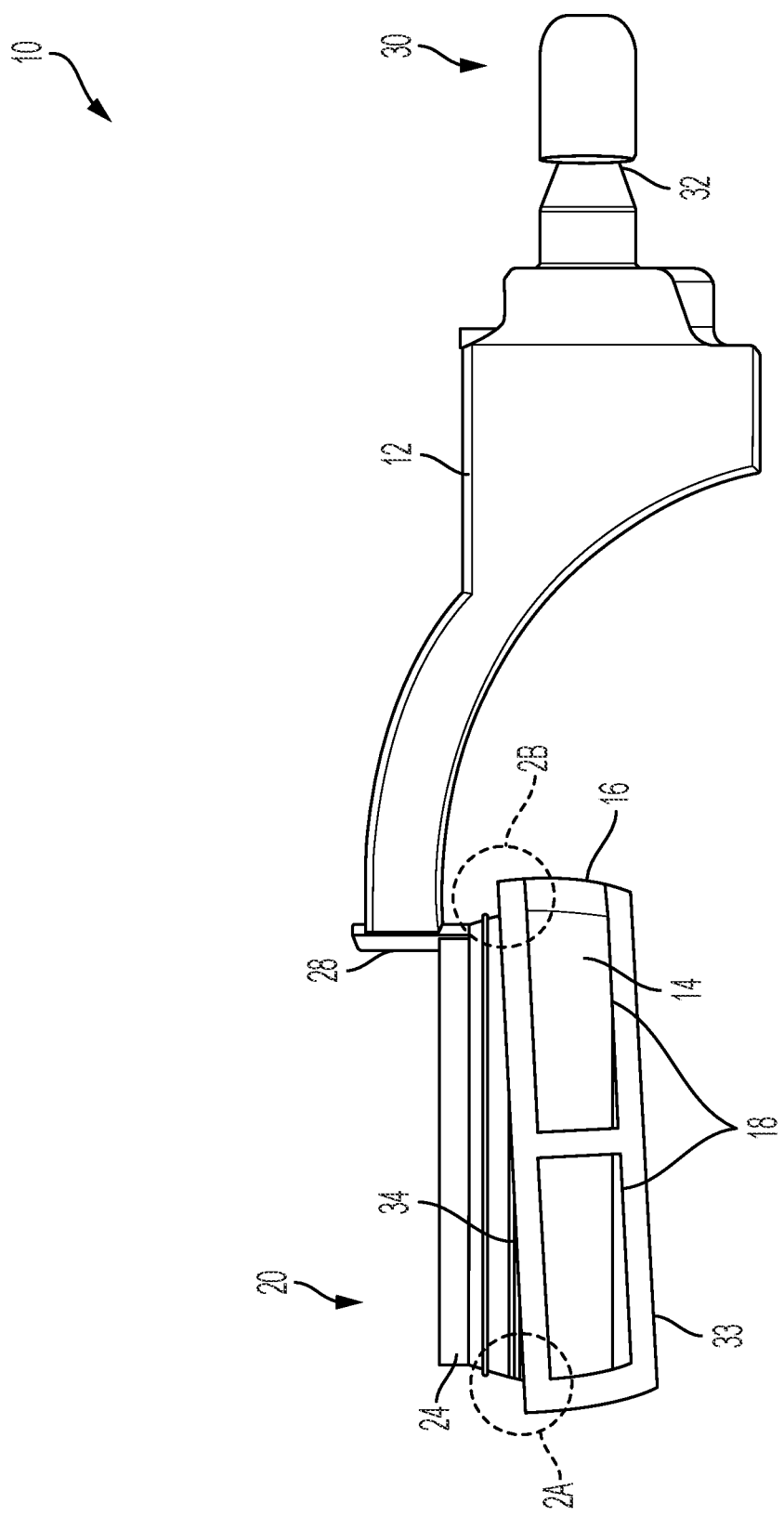
FIG. 1B is a side elevation view of the patellar drill guide of FIG. 1A.

FIGS. 1A and 1B show a patellar drill guide 10 that includes a head 12 and a collar 16. Head 12 includes a bearing end 14 with an outer surface defining a portion of a sphere. An internal surface of collar 16 defines a cavity corresponding in shape to a portion of a sphere approximately equal in size to that defined by the outer surface of bearing end 14. Collar 16 therefore fits rotatably on bearing end 14 so that bearing end 14 and collar 16 together create a ball-and-socket joint. Collar 16 includes a planar lower surface 33 for resting on a surface of a patella into which holes are to be drilled and a planar upper surface 34 that can be used as a visual reference for determining an angular position of collar 16 relative to bearing end 14.

Collar 16 is shaped and proportioned so that lower surface 33 is located entirely below a lowermost point of bearing end 14 for at least some positions, including the positions illustrated in FIGS. 1A and 1B, of collar 16 within a possible range of motion for collar 16 about bearing end 14. Thus, if drill guide 10 is lowered onto a planar surface, such as a surface created on a patella by a resection, lower surface 33 may lie flat upon the planar surface without bearing end 14 contacting the planar surface. A range of motion exists wherein head 12 may also rotate relative to collar 16 while lower surface 33 lies flat on the planar surface without bearing end 14 contacting the planar surface.

In the illustrated arrangement, the portions of a sphere defined by the external surface of bearing end 14 and the internal surface of collar 16 are both spherical segments defined between two parallel planes, but in other arrangements, those portions may be defined between non-parallel planes or non-planar boundaries. Collar 16 of the illustrated arrangement includes windows 18 through which the round outer surface of bearing end 14 can be observed, but in other arrangements windows 18 may be omitted. In other words, collar 16 may be circumferentially continuous without interruption.

Head 12 includes an insert 20 through which cylindrical holes 17 extend to guide drilling tools. Three holes 17 are shown in a triangular formation are included in the illustrated example of insert 20 but inserts 20 can be provided with any quantity or arrangement of holes 17 appropriate for the features intended to be drilled into a bone. Different inserts 20 may therefore be provided with holes 17 in varying arrangements to match pegs of different orthopedic implants.

A bore 22 for receiving insert 20 extends through bearing end 14. A flange 24 having a greater radius than bore 22 extends radially outward from an end of insert 20 to prevent insert 20 from passing freely through bore 22. When head 12 is oriented generally as shown in FIG. 1B, gravity will therefore hold insert 20 in place when insert 20 is disposed in bore 22 so that flange 24 rests atop bearing end 14. In the illustrated arrangement, flange 24 includes a notch 26 to accept a projection 28 of head 12 to prevent insert 20 from rotating within bore 22, but in other arrangements any other feature may be provided to prevent insert 20 from rotating instead of or in addition to notch 26 and projection 28, such as, for example, matching non-cylindrical profiles of insert 20 and bore 22.

Head 12 includes a connector 30 for attaching head 12 to other portions of a tool or system with which head 12 is intended to cooperate. In the illustrated arrangement, connector 30 is provided in the shape of a peg that includes a relatively narrow neck 32 in which a set screw or other fixing element may be received, but in other arrangements connector 30 may take whatever form is appropriate for engaging with corresponding connecting features of a cooperating tool or system, and connector 30 may be omitted altogether in arrangements that do not connect head 12 to other features, such as arrangements wherein head 12 is integrally formed with another part of a tool.

Figure 2B:
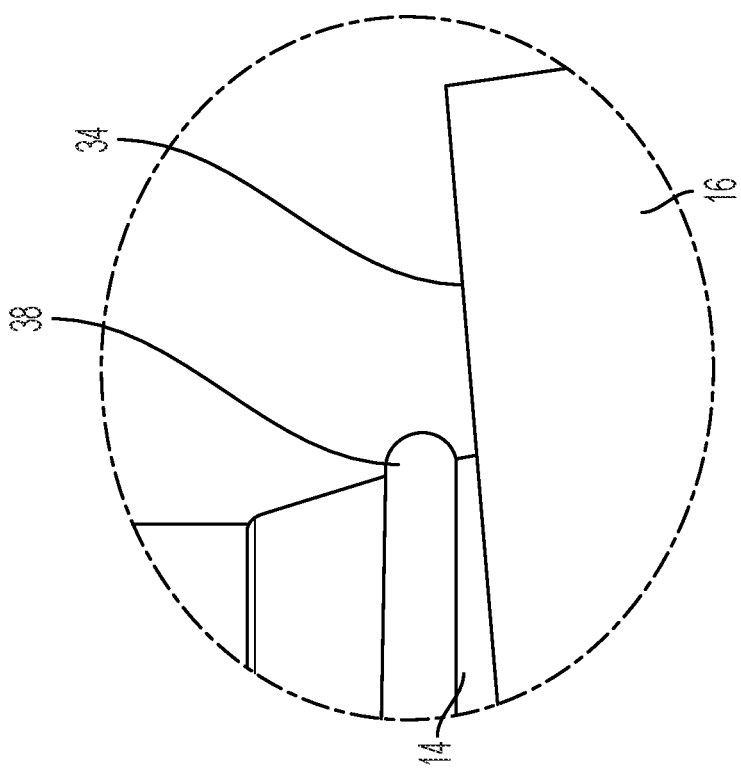
FIGS. 2A and 2B are enlarged views of portions of the patellar drill guide of FIG. 1A.
Figure 2A:
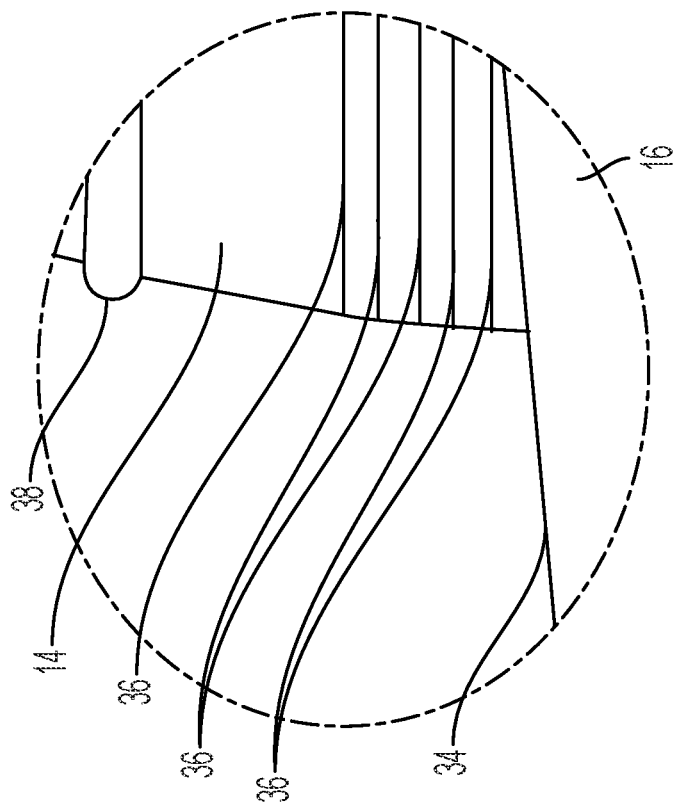

As shown in FIGS. 2A and 2B, a rib 38 may extend around all or part of bearing end 14 to limit a range of rotation available to collar 16 about bearing end 14. In the illustrated arrangement, rib 38 extends around an entire circumference of bearing end 14, but in other arrangements rib 38 may be limited to a specific location or locations on bearing end 14 corresponding to directions along which rotation is intended to be prevented or rib 38 may be omitted altogether.

Referring to FIG. 2A specifically, markings 36 may be provided on the external surface of bearing end 14 to aid visual assessment of a position of collar 16 about bearing end 14. Markings 36 may extend about all of or any portion or portions of a circumference of bearing end 14. Markings 36 may be enumerated, such as, for example, with markings indicating a number of degrees of rotation collar 16 is away from an intended position. In such examples, a user may therefore determine an angular position of collar 16 by reference to a marking 36 nearest to highest or lowest point on an upper surface 34 of collar 16. In various examples markings 36 may be provided in any quantity, such as by provision of only a single marking 36 corresponding to an intended plane to which upper surface 34 is intended to be aligned, multiple markings to indicate degrees of deviation from the intended plane, or no markings 36 at all.

Figure 3A:
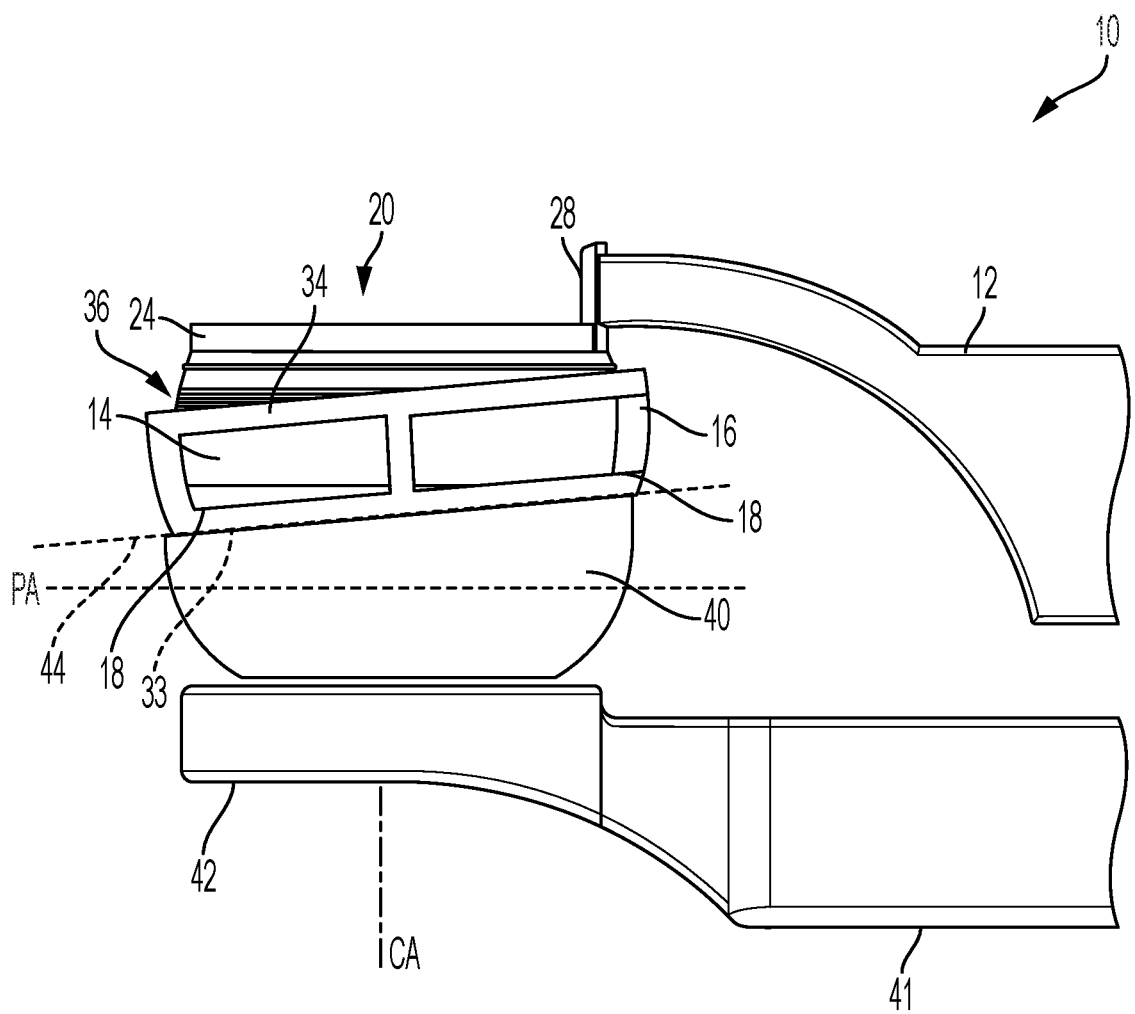
FIG. 3A is a side elevation view of the patellar drill guide of FIG. 1A used in cooperation with a base to clamp a patella.

FIG. 3A illustrates a patella 40 clamped between drill guide 10 and a base 41. Base 41 ends in a block 42 for supporting patella 40. In the illustrated arrangement, block 42 has an annular shape with an opening that is shaped to conform to a surface of patella 40. This is generally because the surface of patella 40 that rests on block 42 is typically convex such that patella 40 interacting with the annular shape of block 42 tends to self-center and therefore shift itself into an appropriate position when it is clamped. In other words, the self-centering feature of block 42 has the effect of positioning the convex curvature of patella 40 such that the lowest point of patella 40 perpendicular to its longitudinal axis PA shifts relative to block 42 and generally centers itself within the annular shaped opening of base 42. FIG. 3A illustrates this via a center axis CA which extends through the lowest point of the convex curvature of patella 40, extends perpendicular to the patellar axis PA, and is centered within block 42. It should be understood though that in other arrangements, block 42 may have any other shape suitable for clamping patella 40 in cooperation with drill guide 10, such as concave spherical curvature.

Patella 40 is prepared with an initial resection on initial resection plane 44 before patella 40 is clamped between drill guide 10 and base 41. When patella 40 is clamped as shown, the planar lower surface 33 of collar 16 is pressed onto the planar surface of patella 40 created by the initial resection. Clamping patella 40 between drill guide 10 and base 41 as shown therefore causes collar 16 to tilt relative to bearing end 14 so that lower surface 33 extends on initial resection plane 44. Because patella 40 is seated upon block 42 in a predictable orientation, an ideal angle for initial resection plane 44 will always be at a specific orientation relative to block 42 when patella 40 is clamped between bearing end 14 and block 42. Thus, if head 12 is positioned at a known orientation relative to base 41, the deviation of initial resection plane 44 from the ideal angle can be determined by observing the position of collar 16 relative to bearing end 14 when patella 40 is clamped.

The ideal angle for initial resection plane 44 corresponds to an intended angle of a mating surface of an orthopedic implant, such as the type of implant commonly referred to as a "patella button," relative to the features of patella 40 that rest on block 42, where the mating surface of the implant is the surface of the implant that will be seated against the surface of patella 40 created by the resection. In the illustrated arrangement, the ideal angle for initial resection plane 44 would be parallel to an upper surface of block 42 and a lower surface of bearing end 14, though in other arrangements the position of the ideal angle relative to any features of drill guide 10 and base 41 may vary according to varying geometries of those features or an implant for which patella 40 is being prepared or according to varying orientations of drill guide 10 and base 41 relative to one another.

In addition to providing a visual reference by which the accuracy of initial resection plane 44 can be assessed, collar 16 compensates for deviations of initial resection plane 44 from the ideal angle so that the angle of holes 17 relative to block 42 is independent from the angle of initial resection plane 44. Assuming head 12 is positioned as intended relative to block 41, a drill may be guided through holes 17 into patella 40 to create holes in intended locations of patella 40 regardless of whether initial resection plane 44 is at an acceptable angle. If the position of collar 16 relative to bearing end 14 reveals that initial resection plane 44 extends at an unacceptable angle, patella 40 may be remediated via a corrective cut 108. Such corrective cut 108 can be made before or after holes are drilled 103 into patella 40, as illustrated in FIG. 3B.

Figure 3B:
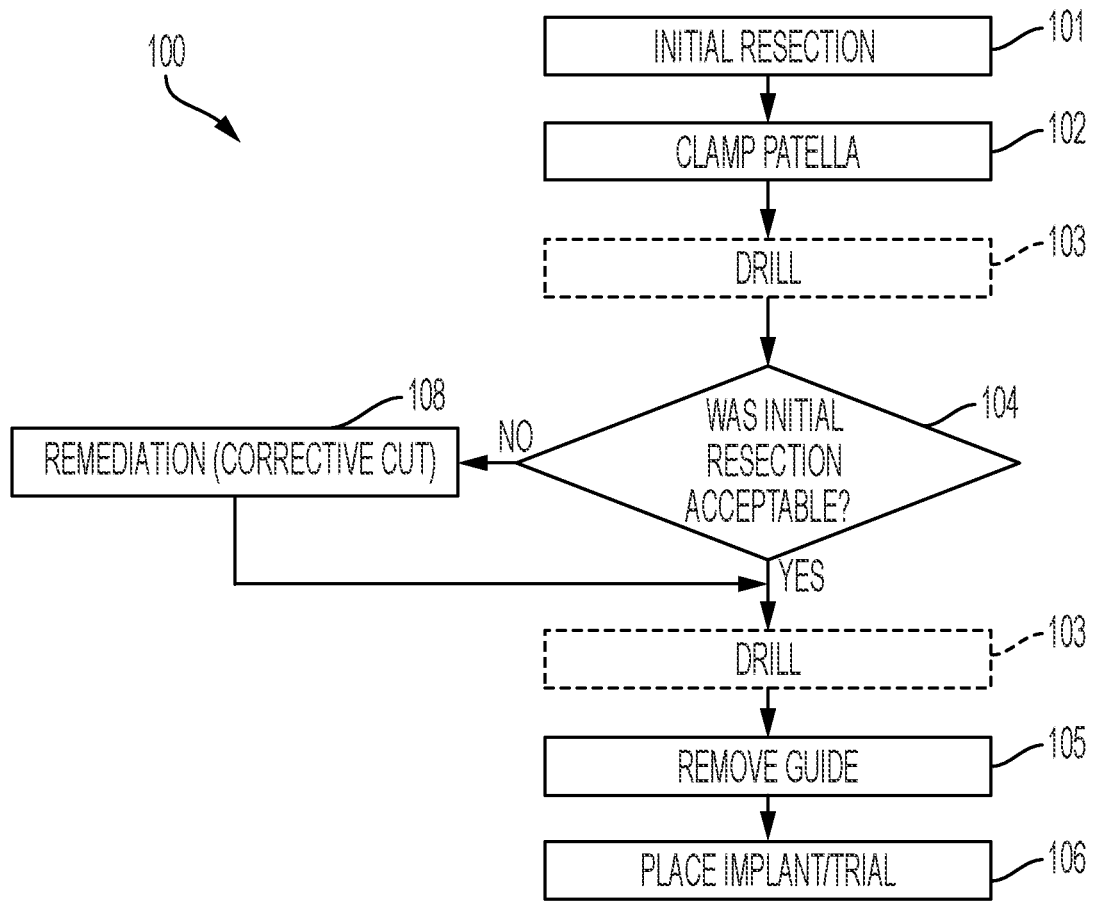
FIG. 3B is a flowchart illustrating a workflow for the patellar drill guide and base of FIG. 3A.

FIG. 3B illustrates a workflow 100 enabled by drill guide 10. In workflow 100, an initial resection step 101 is conducted to create a new surface on patella 40 on initial resection plane 44. The resected patella 40 is then clamped between drill guide 10 and base 41 in clamping step 102. At this point, while patella 40 remains clamped, holes may be drilled in patella 40 through holes 17 of drill guide 10 in drilling step 103. As described further below, this step may be instead reserved for later in the workflow after a corrective cut.

The operator may also observe upon clamping patella 40 with guide 10 whether the initial resection was acceptable. This is illustrated in FIG. 3B in which workflow 100 splits into two possibilities following fork 104 based on a determination of whether initial resection plane 44 is at an acceptable angle. Such determination may be made by observation of the position of collar 16 relative to bearing end 14, such as by referring to markings 36. If initial resection plane 44 is at an acceptable angle, drill guide 10 may be removed from patella 40 in removal step 105 provided that drill holes have been formed in patella 40. After drill guide 10 is removed, an implant, which may be a trial implant or a final implant intended to be left in the body, may be placed on patella 104 in implanting step.

If initial resection plane 44 is not at an acceptable angle, remediation of the resection plane 33 can be performed via one or more corrective cuts 108 may be made to create a new surface on patella 40 at an acceptable angle for the mating surface of the implant and drill guide 10 may be removed in correction step 108. Depending on the hardware and methods used for the corrective cutting and whether drill guide 10 is used as a datum for the correction, the corrections may be made before or after removal of drill guide 10 during correction step 108. However, it is preferable that the guide 10 remain clamped to patella 40 during the corrective cut to help stabilize patella 40 during resection and to ensure the cut is properly indexed to guide 10. If the drilling step 103 has not yet been performed, the operator may then proceed to drill peg holes in patella 40 through the newly resected surface. As indicated in FIG. 3B, the drilling step 103 may be performed before or after the corrective cut 108 as guide 10 allows for the same drilling orientation regardless of the acceptability of the initial resection. However, it should be understood that if the drilling step 103 is performed before the corrective cut, the drill depth may need to be increased to account for the amount of bone that will ultimately be removed via the corrective cut 108. The additional depth needed for such an early drilling step can be determined at least partially based on the assessment of the initial resection via markings 36. Implanting step 106 then follows correction step 108. Implantation can be of a final implant or a trial implant.

Figure 4A:
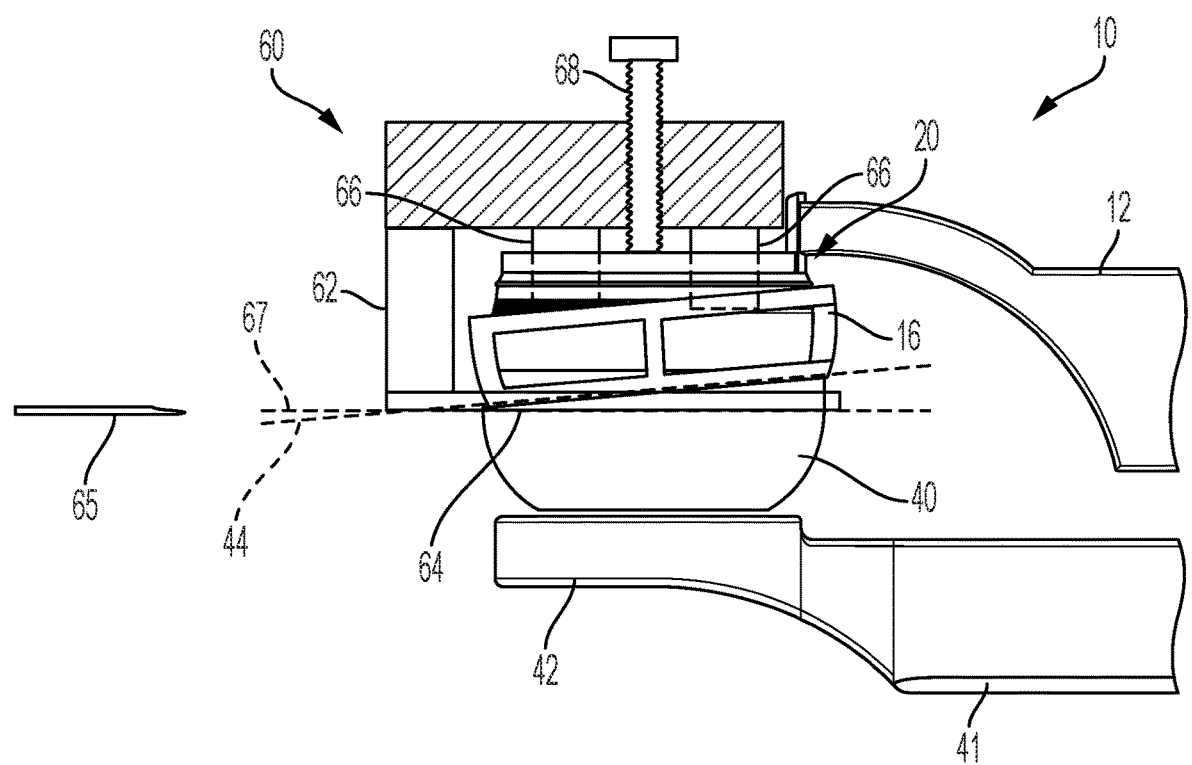
FIG. 4A is a side elevation view of the patellar drill guide and base of FIG. 3A with a resection guide attached to the patellar drill guide.

FIG. 4A illustrates a corrective resection guide 60 that may be used to cut patella 40 accurately if initial resection plane 44 is found unacceptable. Corrective resection guide 60 includes an arm 62 that defines a resection guide surface 64 for guiding a cutting tool 65, such as, for example, an osteotome, bone saw, or any other tool usable for cutting bone. Resection guide surface 64 thus in turn defines a corrective resection plane 67 corresponding to the plane of a surface that can be created on patella 40 by guiding cutting tool 65 along resection guide surface 64. The structure of the portion of arm 62 on which resection guide surface 64 is defined can take any form appropriate for the type of cutting tool 65 used, such as, for example, being in the shape of an arc that extends around patella 40 as shown in the illustrated arrangement or narrower shapes in other arrangements. Moreover, resection guide surface 64 according to various arrangements can be a bottom surface of arm 62 as illustrated, one side of a slot extending through arm 62, or any other surface usable to guide a cutting tool 65. Alternatively, guide surface 64 can instead be a slot or the like to guide a marking apparatus, such as a surgical pen or bovie, for example, so that the operator can use guide 60 to mark a resection plane on patella 40 which may then be used to resect patella 40. Similarly, arm 62 may have an adapter (not shown) that can hold the marking apparatus and constrain its movement to a desired cutting plane. Additionally, guide 60 and/or arm 62 may be rotatable about an axis defined by the bolt 68 and centered within drill guide 10 so that the marking apparatus can be moved about the patella 40 in order to mark the resection plane.

Corrective resection guide 60 may use drill guide 10 as a datum to establish a proper angle for corrective resection plane 67 relative to patella 40. Corrective resection guide 60 can therefore be relied on to create a new surface on patella 40 that extends at an intended angle for the mating surface of the implant to be implanted on patella 40. Corrective resection plane 67 will generally extend at the same angle that would have been an ideal angle for initial resection plane 44. In the illustrated arrangement, the use of drill guide 10 as a datum for correction resection guide 60 is enabled by guide pegs 66 included by corrective resection guide 60 and fitting closely within holes 17, thereby constraining corrective resection guide 60 from rotating relative to head 12. However, in other arrangements corrective resection guide 60 could be attachable to head 12 or base 10 in any other way that enables use of drill guide 12 or base 10 as a datum for reliable alignment of resection guide surface 64 at an intended angle for corrective resection of patella 40.

Corrective resection guide 60 may also be adjustable relative to head 12 in a manner that enables shifting of corrective resection plane 67 without rotation of corrective resection plane 67. Shifting corrective resection plane 67 this way enables a user to preserve a maximum amount of bone stock while removing as much of a surface patella 40 that extends along initial resection plane 44 as necessary and avoiding contact between cutting tool 65 and collar 16. Such shifting may be accomplished by structures enabling translation of resection guide surface 64 along an axis normal to corrective resection plane 67. In the illustrated example, such translation is facilitated by a bolt 68 having a flat end that bears on a top of insert 20 and threadedly engages an internally threaded bore in a body portion of corrective resection guide 60. Because the fit of guide pegs 66 into holes 17 constrains the movement of corrective resection guide 60 relative to head 12, turning bolt 68 within the internally threaded bore will cause corrective resection guide 60 to ascend or descend relative to head 12. Other mechanisms for shifting resection guide surface 64 may be used in other arrangements, such as, for example, a rack and pinion connection between arm 62 and the main body of corrective resection guide 60.

Figure 4B:
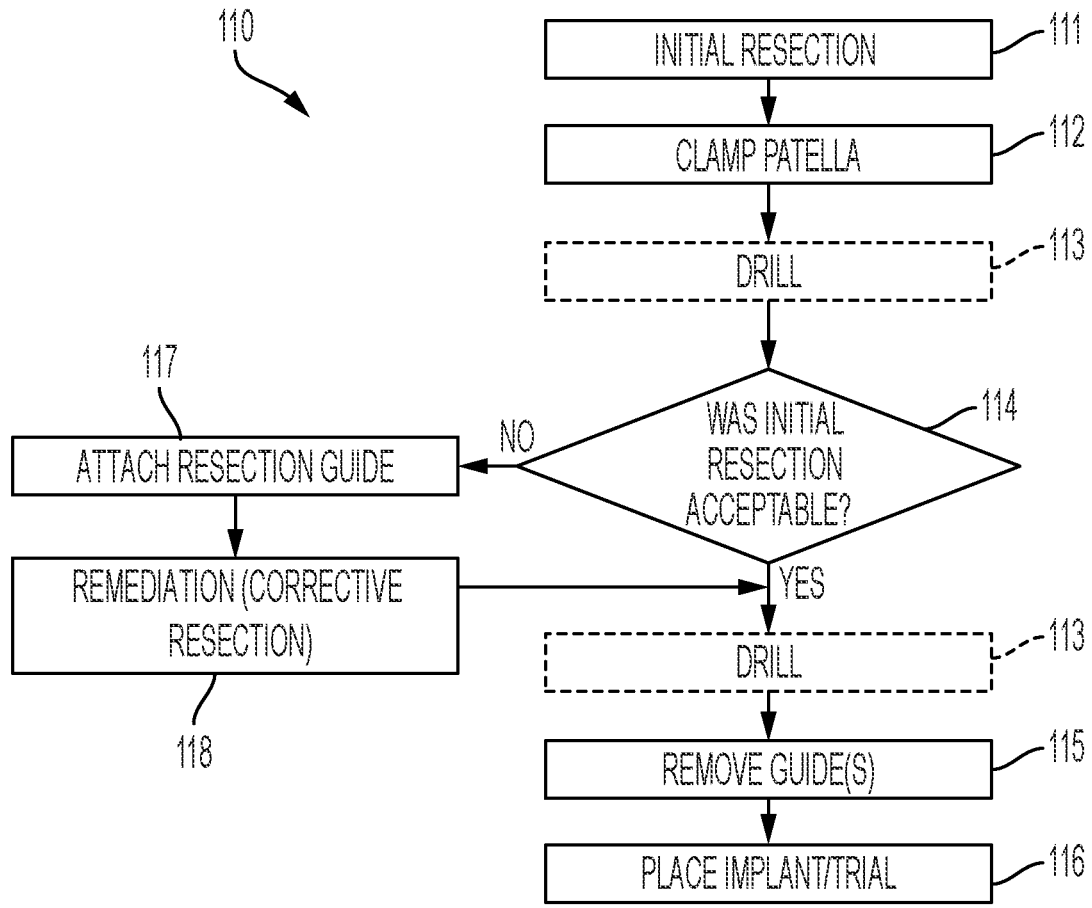
FIG. 4B is a flowchart illustrating a workflow for the patellar drill guide, base, and resection guide of FIG. 4A.

FIG. 4B shows a workflow 110 for using drill guide 10 in cooperation with block 41 and corrective resection guide 60.

In workflow 110, initial resection step 111, clamping step 112, drilling step 113, fork 114, removal step 115, and implanting step 116 are the same as initial resection step 101, clamping step 102, drilling step 103, fork 104, removal step 105, and implanting step 106 of workflow 100. Additionally, just as in workflow 100, drilling step 113 can be performed either before or after remediation 118 of the initial resection. However, in workflow 110, if a determination is made at fork 114 that initial resection plane 44 is unacceptable, corrective resection guide 60 is attached to drill guide 10 as shown in FIG. 3A and adjusted to put corrective resection plane 67 at an intended location in attachment step 117. Cutting tool 65 is then guided on resection guide surface 64 to cut patella 40 on corrective resection guide 60 in corrective resection step 118. After corrective resection step 118, corrective resection guide 60 is removed, optionally at the same time as drill guide 10 is removed, in removal step 115 which may depend on when the drilling step 113 is performed relative to corrective resection 118.

Figure 5A:
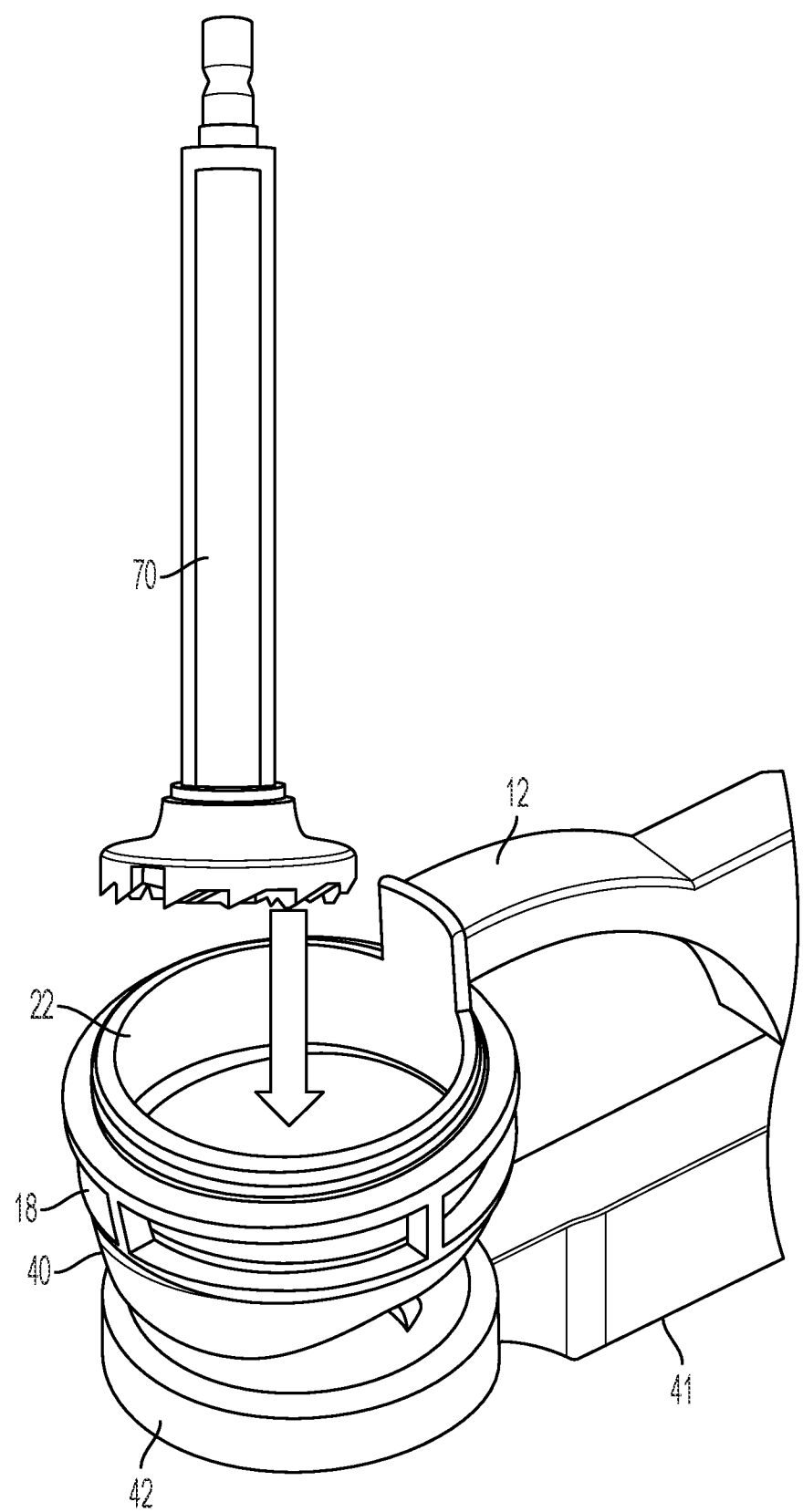
FIG. 5A is a perspective view of the patellar drill guide and base of FIG. 3A and a reamer.

FIG. 5A shows use of a face reamer 70 in cooperation with drill guide 10 and base 41 to correct deviation of the top surface of patella 40 from an intended angle. As shown in FIG. 5A, insert 20 is removed so that reamer 70 may be inserted into bore 22 to reach patella 40. If reamer 70 has a large enough diameter, bore 22 can be used to guide reamer. Otherwise, reamer 70 could be used with other guiding structures and may travel laterally as necessary to mill away excess bone or cut away the excess bone in multiple face reaming steps at different locations across the top of patella 40. After reaming is finished, any burrs left at the edge of the reamed surface of patella 40 can be removed, such as by use of cutting tool 65.

Figure 5B:
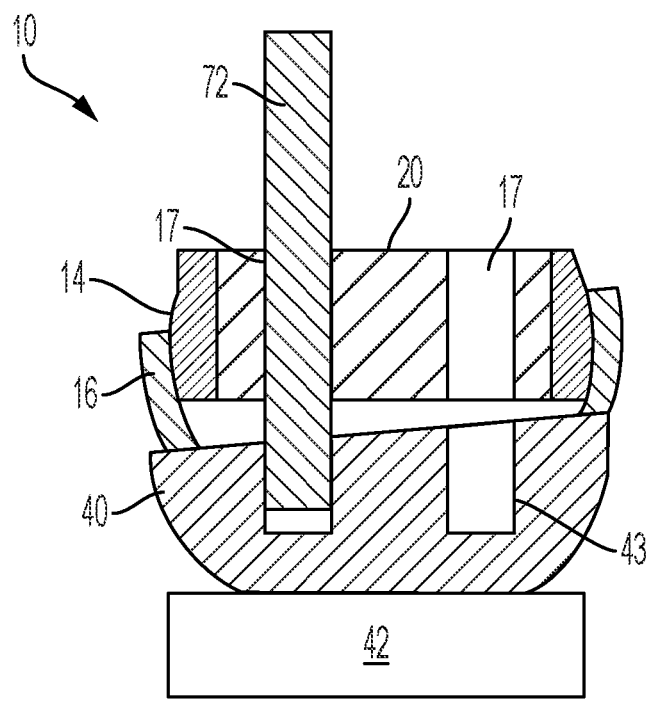
FIGS. 5B-5E are cross-sectional views of the patellar drill guide, base, and patella of FIG. 3A in stages of a resurfacing process.
Figure 5C:
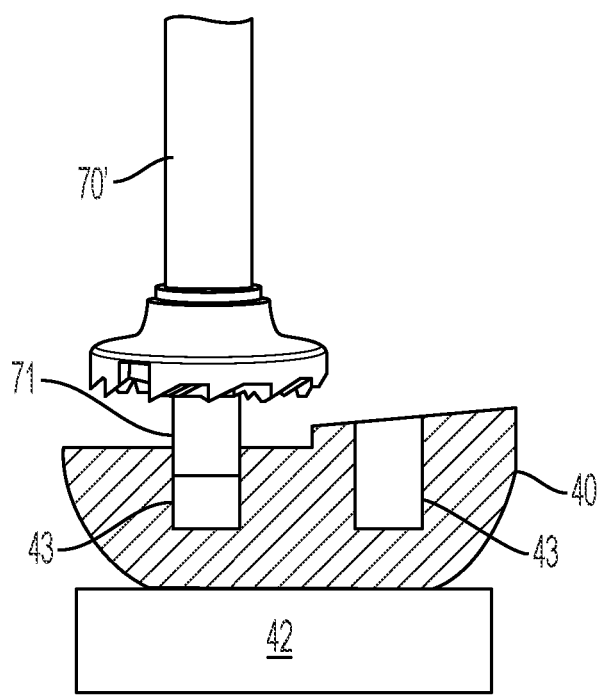
Figure 5D:
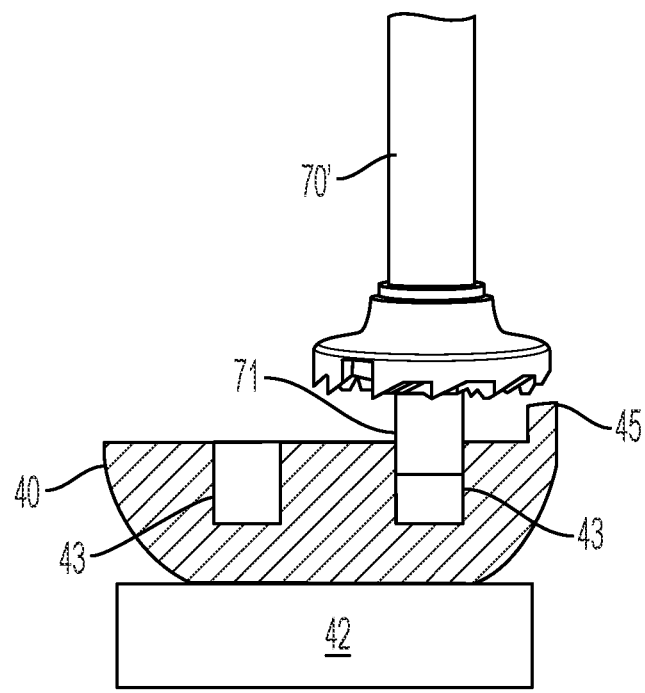

FIGS. 5B-5E illustrate stages of a multi-stage reaming process using a reamer 70' that ends in a guide peg 71 centered on reamer's 70' axis of rotation. As shown in FIG. 5B, a drill 72 may be guided through holes 17 to drill holes 43 in patella 40 in a manner consistent with drilling steps 103, 113. Reamer 70' may then be used to ream the top surface of patella 40 in successive steps guided by insertion of guide peg 71 into holes 43 as shown in FIGS. 5C and 5D. Because reamer 70' is guided by a close fit of guide peg 71 into holes 43, reamer 70' will approach patella parallel to the axes along which holes 43 were drilled. Thus, if holes 43 were drilled along parallel axes as shown, which would be appropriate for preparation of patella 40 for typical patella button implants, a new, continuous, flat surface on a plane normal to the central axes of holes 43 can be created on top of patella 40 by reaming patella 40 at each hole 43 with reamer 70'. The use of holes 43 and guide peg 71 to guide reamer 70' means that drill guide 10 may optionally be removed from patella 10 during the reaming process as shown in FIGS. 5C and 5D. However, drill guide 10 may optionally be left on patella 40 to keep patella 40 clamped throughout the reaming process if a user so desires.

Figure 5E:
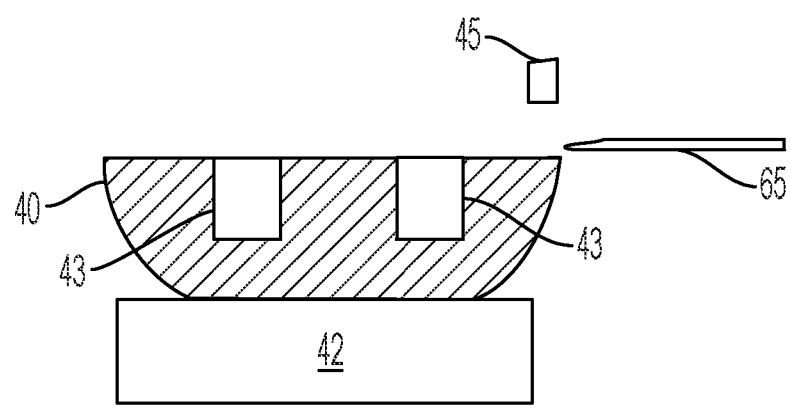

Reaming patella 40 as shown in FIGS. 5C and 5D may result in a burr 45 or burrs 45 at locations that reamer 70' does not reach. Thus, if burrs 45 remain, cutting tool 65 may be used to remove burrs 45 as shown in FIG. 5E. If drill guide 10 was not removed prior to reaming, drill guide 10, patella 40 will be clamped between drill guide 10 and base 41 with collar 16 bearing on burrs 45. Drill guide 10 is therefore generally removed prior to deburring to avoid cutting at burrs 45 while they remain loaded by collar 16.

Figure 5F:
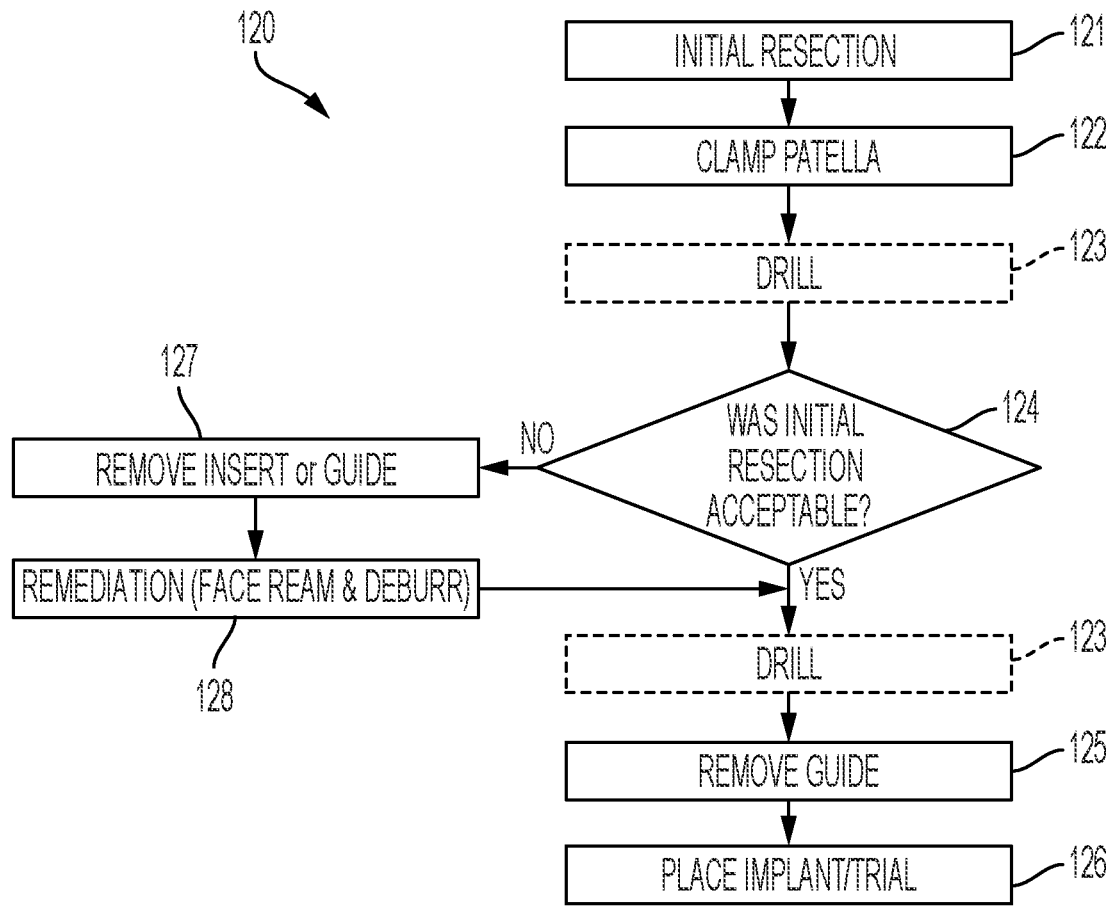
FIG. 5F is a flowchart illustrating a workflow that includes the resurfacing process of FIGS. 5A-5D.

FIG. 5F shows a workflow 120 for using drill guide 10 in cooperation with block 41 and a reamer 70 or 70'. In workflow 120, initial resection step 121, clamping step 122, drilling step 123, fork 124, removal step 125, and implanting step 126 are the same as initial resection step 101, clamping step 102, drilling step 103, fork 104, removal step 105, and implanting step 106 of workflow 100. In this regard, drilling step 103 can be performed before or after remediation of the initial resection. However, in workflow 120, if a determination is made at fork 124 that initial resection plane 44 is unacceptable, insert 20 or guide 10 is removed in step 127 so that a remediation step 128 can be performed. Thus, insert 20 may be optionally removed in insert removal step 127 according to user preference and as appropriate for the reaming tools to be used (see e.g., FIG. 5A). Alternatively, the entirety of drill guide 10 may be removed in guide removal step 127 according to user preference and as appropriate for the reaming tools to be used (see e.g., FIGS. 5B-5E.)

The remediation step 128 may then be performed which may include reaming and optionally deburring patella 40. In this regard, patella 40 is then reamed which can include any amount of reaming or milling necessary to achieve an acceptable result. Remediation step 128 can therefore be, for example, use of bore 22 to guide a large reamer 70 to create a new surface on patella 40 in one pass or use of a guided reamer 70' in cooperation with holes 43 drilled in patella 40. If a burr 45 or burrs 45 remain, the remediation step of 128 also includes deburring wherein drill guide 10 is removed and cutting tool 65 is used to remove burrs 45 from the top of patella 40.

Once remediation 118 is completed, the operator may perform the drilling step 113 if it has not yet been performed. Whatever guides remain attached to patella 40 can then be removed in a guide removal step 125, and a final or trial implant may be implanted onto patella 40 in an implanting step 126.

FIG. 6 is an exploded view of a tool that may be created by assembling drill guide 10 and base 41 to a handle 50. Grip 50 includes a first lever 51, a second lever 52, a first bar 53, a second bar 54, and two third bars 55. First lever 51 and second lever 52 are pivotably joined to one another at fulcrum 56, enabling levers 51 and 52 to be gripped and actuated in a manner similar to scissors. Though not illustrated, handle 50 may also include a lock configured to prevent the proximal ends of levers 51, 52 from travelling away from each other when the lock is engaged.

The distal ends of first bar 53 and second bar 54 each include a socket 57 for receiving either connector 30 of drill guide 10 or a similar connector 46 of base 41. Each socket 57 is provided with a set screw or similar setting element that can be driven to engage connectors 30, 47, such as by extending into a neck 32 thereof. Drill guide 10 and base 41 can therefore each be connected to handle 50 at a respective socket 57 so that drill guide 10 and base 41 will travel toward or away from each other as first bar 53 and second bar 54 travel toward or away from each other, respectively.

First bar 53 and second bar 54 each include slots enabling them to be slidably connected to other elements. First bar 53 is pivotably, but not slidably, connected to the distal end of second lever 52 and both pivotably and slidably connected to first lever 51 by a pin 58 located between the proximal and distal ends of first lever 51. Similarly, second bar 54 is pivotably, but not slidably, connected to the distal end of first lever 51 and both pivotably and slidably connected to second lever 52 by a pin 59 located between the proximal and distal ends of second lever 52. Actuating handle 50 by gripping levers 51, 52 and bringing proximal ends of levers 51, 52 nearer to one another therefore brings first bar 53 and second bar 54 closer to one another and causes a pin extending point 58 to slide proximally along the slot of first bar 53 and a pin extending from point 59 to slide proximally along the slot of second bar 54. The opposite interactions between levers 51, 52 and the first bar 53 and second bar 54 will occur when the proximal ends of levers 51, 52 are allowed to travel away from one another. Third bars 55 are each pivotally connected to the distal ends of both levers 51, 52 and slidably connected to the distal end of at least one of the levers 51, 52, specifically the distal end of second lever 52 in the illustrated arrangement, to provide guidance and stability during actuation of handle 50, but third bars 55 may optionally be omitted in other arrangements.

Pins 58, 59 are located along levers 51, 52, respectively so that first bar 53 remains at a constant angle relative to second bar 54 across an entire range of possible rotation of first lever 51 relative to second lever 52 about fulcrum 56. When drill guide 10 and base 41 are connected to handle 50 by sockets 57, handle 50 can therefore be actuated to clamp objects, such as patella 40, of varying thicknesses between drill guide 10 and base 41 without the angle of drill guide 10 relative to base 41 varying. Thus, handle 50 can be used in cooperation with drill guide 10 and base 41 to facilitate assessment of an initial resection plane 44 by reference to the position of collar 16 about bearing end 14 when patella 40 is clamped between drill guide 10 and base 41 as described above, which requires knowledge of the angle of head 12 relative to base 41.

Figure 7:
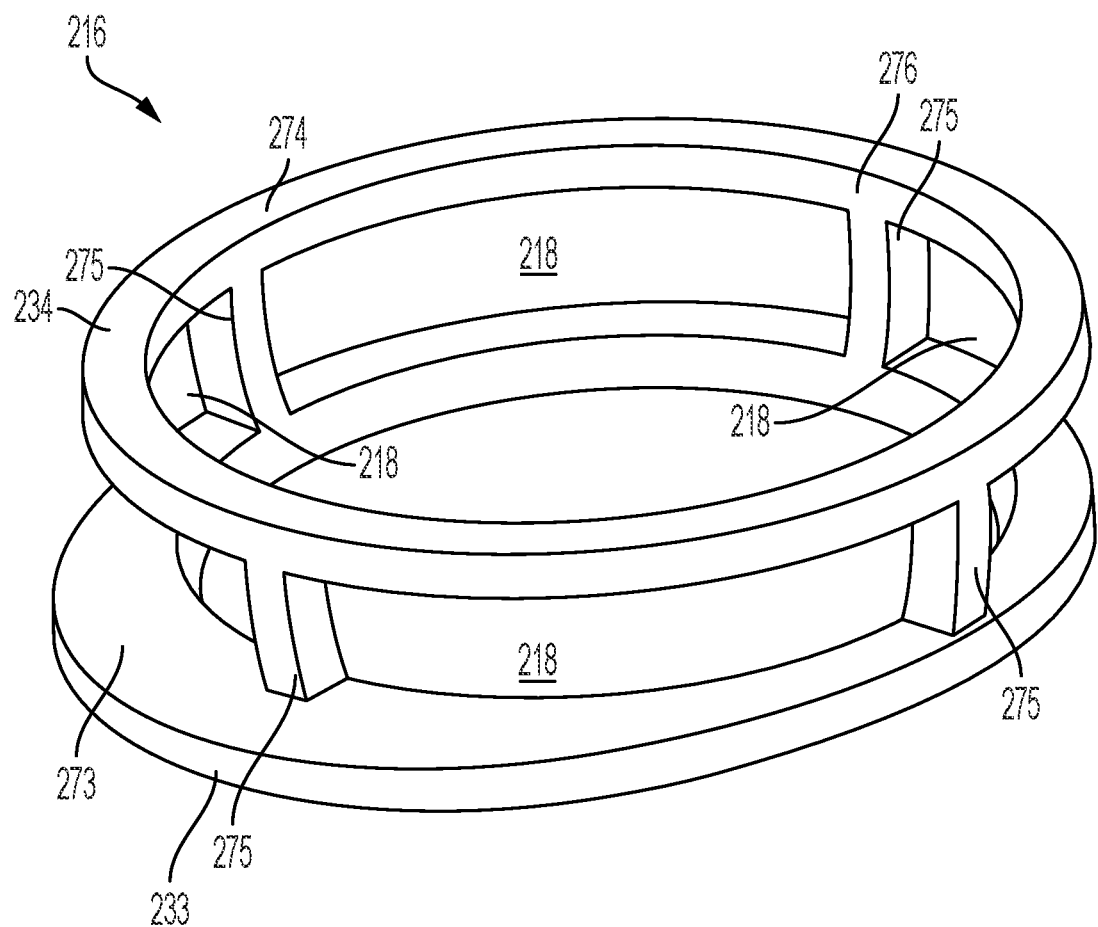
FIG. 7 is a perspective view of an example of a collar usable with the patellar drill guide of FIG. 1A.

FIG. 7 illustrates a collar 216 that can be used with head 12 to create a drill guide like drill guide 10 described above. Collar 216 includes an upper ring 274 and a lower ring 273 joined by pillars 275. An upper surface 234 of collar 216 is defined on the top of upper ring 274 and a lower surface 233 of collar 26 is defined on the bottom of lower ring 273. Windows 218 are defined by the spaces between upper ring 274, lower ring 273, and pillars 275. Upper ring 274, lower ring 273, and pillars 275 collectively define a concave interior surface 276 corresponding in shape to a portion of a sphere. The portion of a sphere to which interior surface 276 corresponds in shape has a radius nearly equal to the radius of the portion of a sphere defined by bearing end 14, meaning bearing end 14 can be rotatably received in collar 216 to create a ball-and-socket joint.

Collar 216 is the same as collar 16 in all respects except that lower ring 273 has an oblong shape, creating a similarly oblong footprint for lower surface 233 of collar 216, whereas the corresponding features of collar 16, including lower surface 33, are circular. Collar 216 may therefore be suitable for use on a larger or more oblong patella than collar 16. Other collars with lower rings of varying shapes may be provided for use in cooperation with head 12 to create drill guides suitable for patellas of various shapes and sizes.

Figure 8:
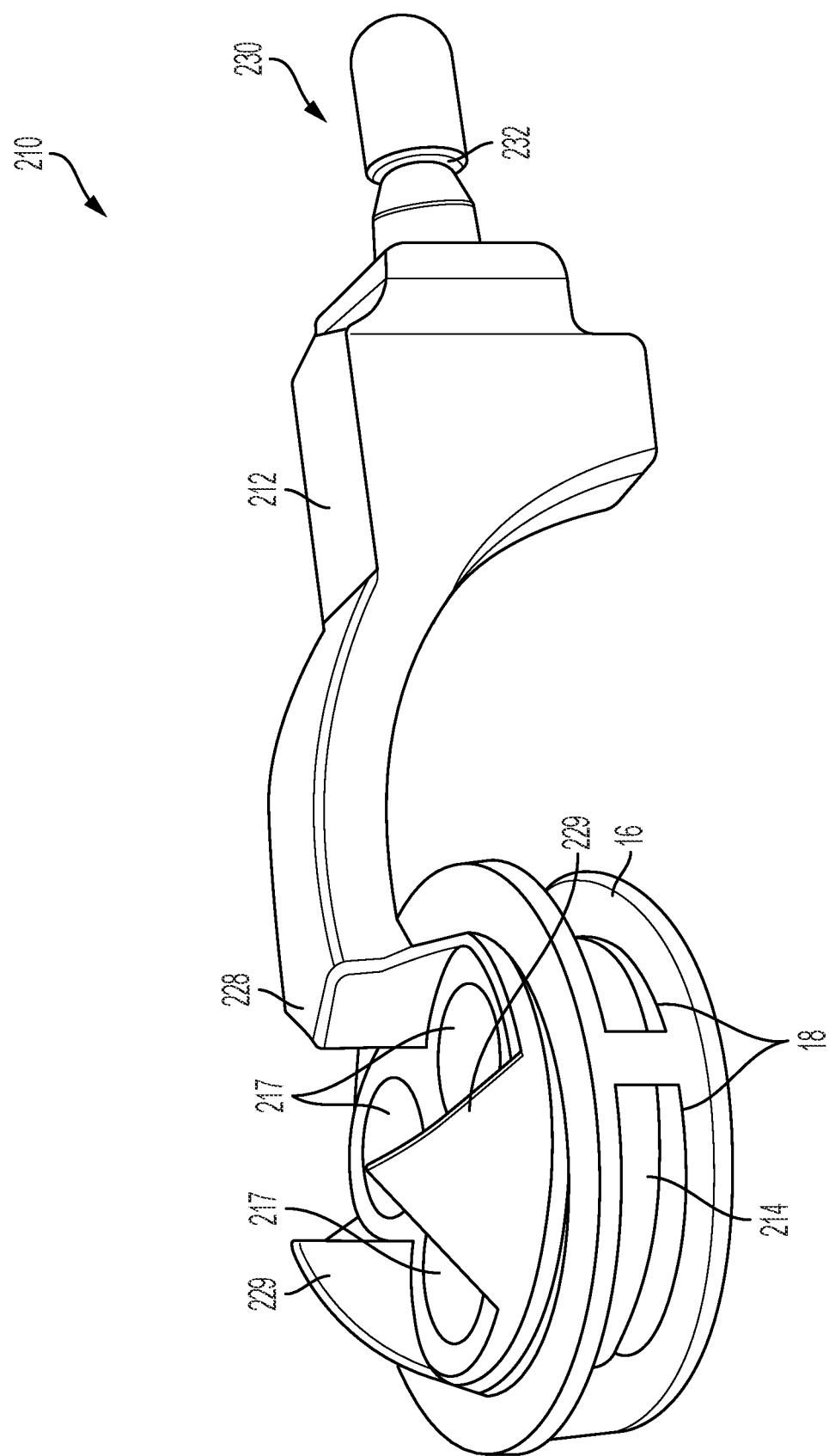
FIG. 8 is a perspective view of a patellar drill guide according to another arrangement.

FIG. 8 shows a drill guide 210 created by use of a head 212 together with collar 16. Head 212 is similar to head 12 except for differences explicitly described or shown in FIG. 8. Thus, elements of head 212 in the 200-series are alike to like numbered elements of head 12 in the 00-series, meaning connector 230 is alike to connector 30, neck 232 is alike to neck 32, and so on, except for differences explicitly described or shown in FIG. 8.

In head 212, holes 217 are integrally formed through bearing end 214. Optional additional projections 229 in addition to projection 228 extend upward from bearing end 229 to aid with the alignment of attachments to the bearing end 214, such as corrective resection guides similar to corrective resection guide 60 but adapted for use with head 212.

Figure 9:
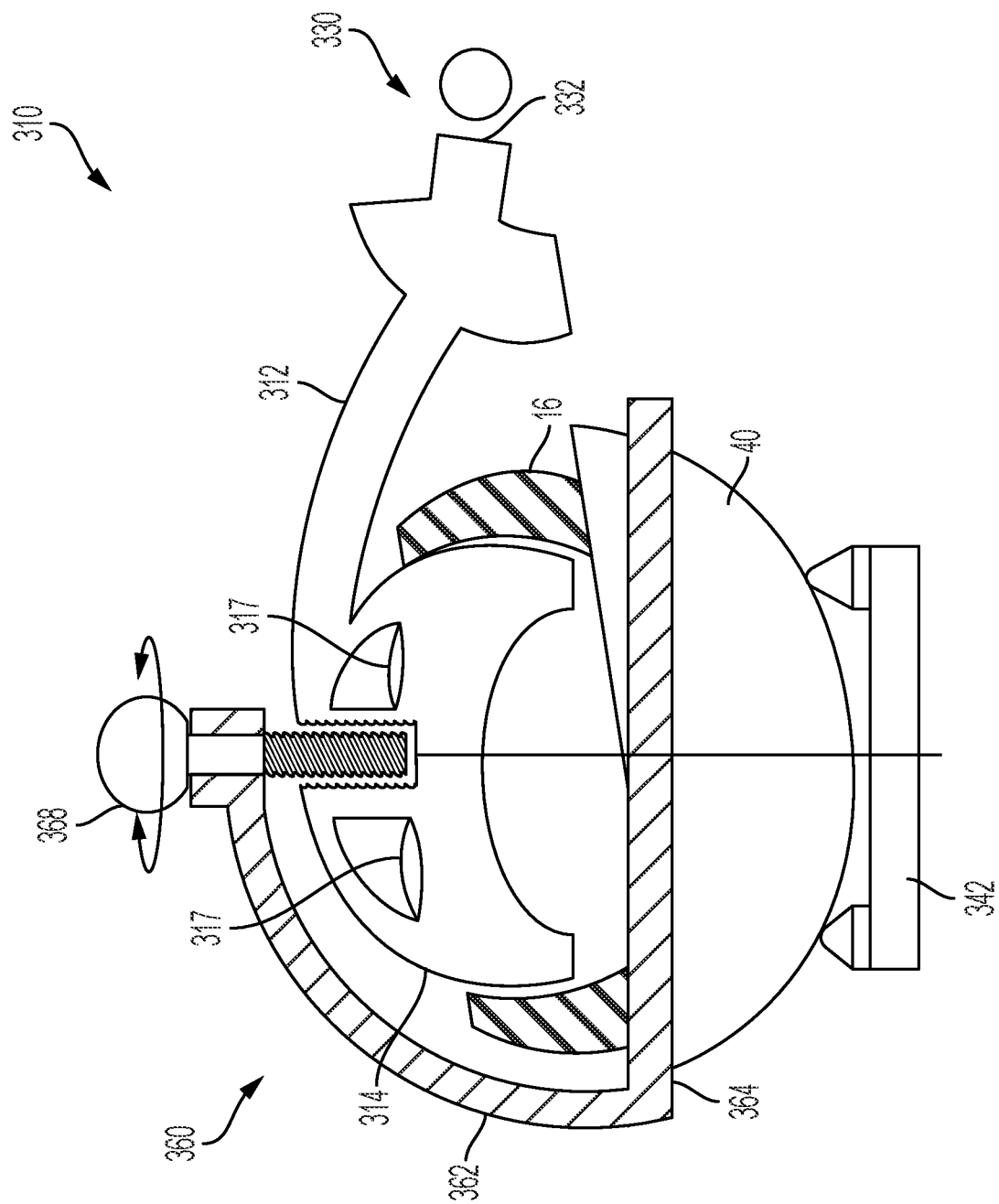
FIG. 9 is a cross-sectional view of a patellar drill guide and resection guide according to another example.

FIG. 9 shows a drill guide 310 created by use of a head 312 together with collar 16. Head 312 is similar to heads 12, 212 except for differences explicitly described or shown in FIG. 9. Thus, elements of head 312 in the 300-series are alike to like numbered elements of head 12 in the 00-series and head 212 in the 200-series, meaning connector 330 is alike to connectors 30, 230, neck 332 is alike to necks 32, 232, and so on, except for differences explicitly described or shown in FIG. 9. Like holes 217 of head 212, holes 317 are integrally formed through bearing end 314 rather than through a removable insert. Like drill guide 10, drill guide 310 is usable in cooperation with a block 342 to clamp a patella 40.

FIG. 9 also shows a corrective resection guide 360 mounted to drill guide 310. Corrective resection guide 360 is similar to corrective resection guide 60 except for differences explicitly described or shown in FIG. 9. Thus, elements of corrective resection guide 360 in the 300-series are alike to like numbered elements of corrective resection guide 60 in the 00-series, meaning arm 362 is alike to arm 62, resection guide surface 364 is alike to resection guide surface 64, and so on, except for differences explicitly described or shown in FIG. 9.

Corrective resection guide 360 is vertically adjustable relative to drill guide 310 by turning a bolt 368. Bolt 368 is rotatably, but non-translatably connected to corrective resection guide 360 so that a non-threaded portion of a shank of bolt 368 is received in a similarly non-threaded bore through a portion of corrective resection guide. A threaded portion of the shank of screw 368 is located distally of the non-threaded portion and threadedly engages an internally threaded bore extending into bearing end 314. Rotating screw 368 relative to head 312 will therefore cause corrective resection guide 360 to travel vertically relative to drill guide 310. Corrective resection guide 360 may optionally include pegs receivable in holes 317 to restrain corrective resection guide 360 from rotating relative to head 312 when installed, though no such pegs are illustrated.

FIGS. 10A-10D depict a corrective resection guide 460 according to another embodiment of the present disclosure. Corrective resection guide 460 is similar to corrective resection guide 60 except for differences explicitly described or shown. Thus, elements of corrective resection guide 460 in the 400-series are alike to like numbered elements of corrective resection guide 60 in the 00-series.

Figure 10A:
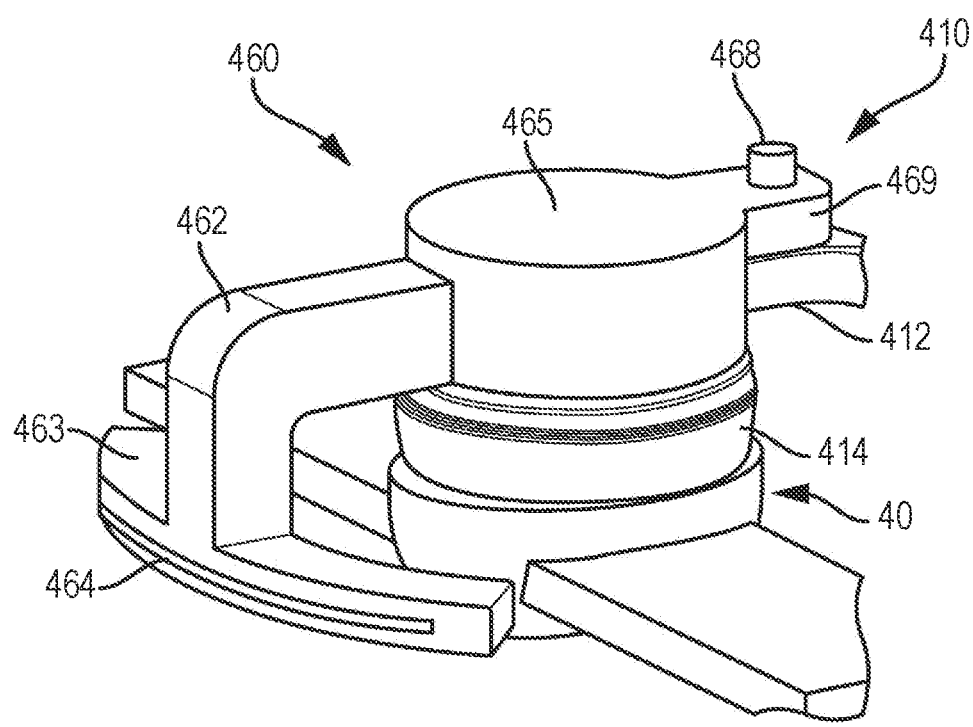
FIG. 10A is a perspective view of a patellar drill guide and resection guide according to a further example.
Figure 10B:
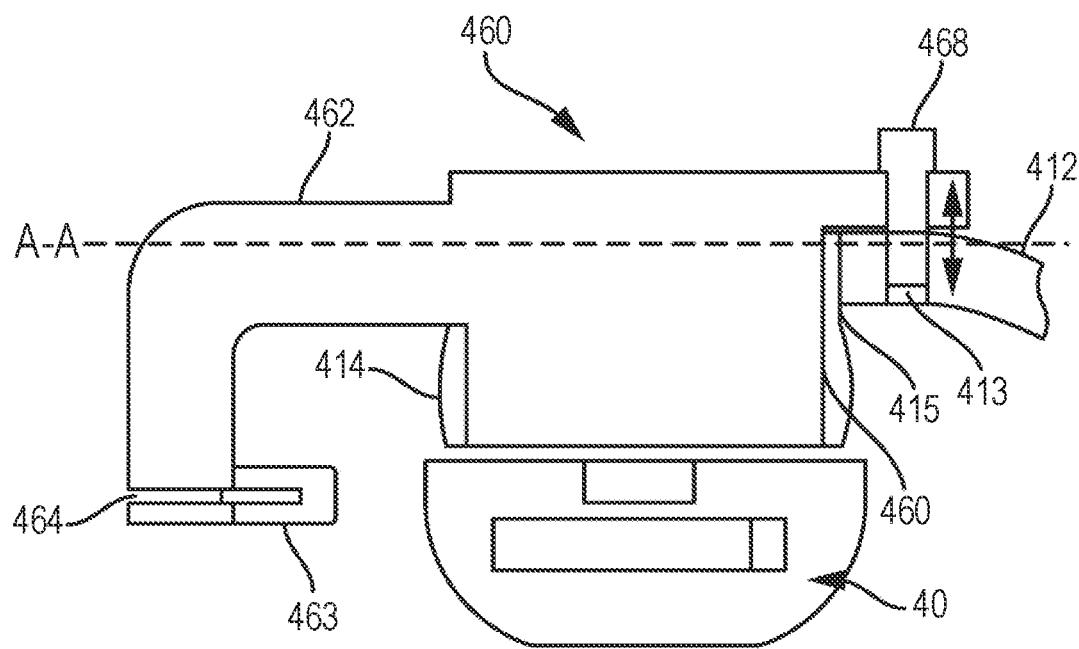
FIG. 10B is a cross-sectional view of the patellar drill guide and resection guide of FIG. 10A taken along a midline thereof.
Figure 10C:
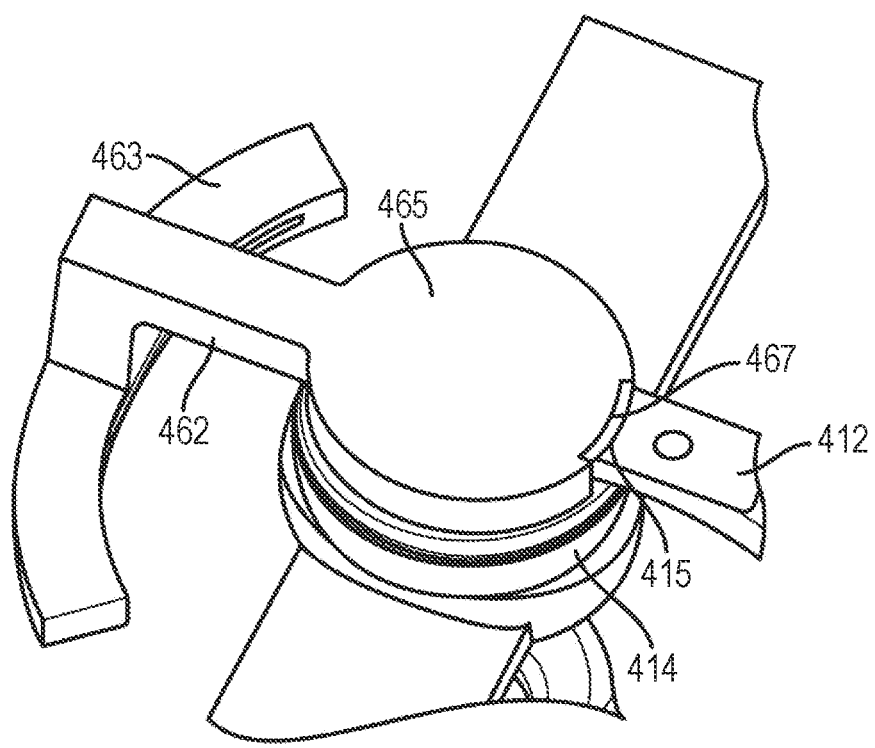
FIG. 10C is a perspective cross-sectional view of the patellar drill guide and resection guide of FIG. 10A taken along line A-A of FIG. 10B.
Figure 10D:
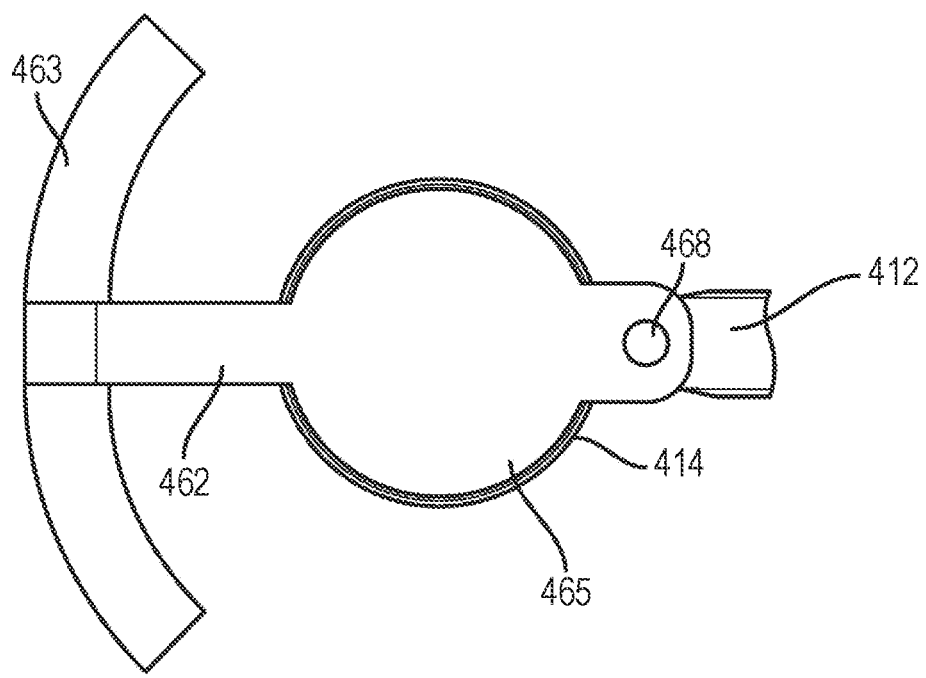
FIG. 10D is a cross-sectional view of the patellar drill guide and resection guide of FIG. 10A taken along line A-A of FIG. 10B.

Corrective resection guide 460 generally includes an arm 462, a guide flange 463, a body 465, and retention tab 469. Body 465 is generally cylindrical and is configured to be received within a bore of bearing end 414 of guide 410. Additionally, body 465 has an axially extending slot 467 that is configured to receive a corresponding protrusion of head 412, as best shown in FIG. 10C. Such slot and protrusion define an orientation feature that constrains body 465 from rotation within bearing end 414 and establish a proper orientation for guide flange relative to patella 40. Arm extends from outwardly and then downwardly. Guide flange is connected to an end of arm and has a generally arcuate shape so that it extends about a portion of patella when guide 460 is attached to guide 410. Guide flange 463 has a guide slot 464 or alternatively a guide surface to guide a bone saw or the like in a manner previously described to perform a remedial patellar resection. Retention tab 469 extends from body 465 from an opposite side thereof than arm 462. Retention tab 469 also extends along a portion of head 412 so that a fastener 468 extending through retention tab 469 aligns with and engages a threaded opening 413 in head 412, as best shown in FIG. 10B. Thus, in use, guide 460 may be connected to guide 410 by placing body 465 into the bore of bearing end 414 and so that protrusion 415 is received within slot 467. Fastener 468 is then threadedly engaged to threaded opening 413 to secure guide 460 to guide 410.

Although the concepts herein have been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A patellar drill guide, comprising:
 a head having an outer surface, the outer surface being convexly curved, and at least one channel extending through the head; and
 a collar having an inner surface being concavely curved and corresponding in shape to at least a portion of the outer surface of the head and being fitted to the head to define an articular joint therebetween,
 wherein the head comprises a bore and an insert, the insert defining the at least one channel and being removably received within the bore of the head.

2. The drill guide of claim 1, wherein the collar includes a first planar surface and a second planar surface, and the inner surface is defined between the first planar surface and the second planar surface.

3. The drill guide of claim 2, wherein the collar is rotatable such that the second planar surface is at an acute angle relative to a central axis of the at least one channel.

4. The drill guide of claim 2, wherein the head comprises a marking on the outer surface with which the second planar surface is coplanar when the first planar surface is normal to a central axis of the at least one channel.

5. The drill guide of claim 4, comprising multiple angle markings offset from a linear marking and with which the second planar surface coincides with when the first planar surface is not normal the central axis of the at least one channel.

6. The drill guide of claim 1, wherein the collar includes at least one window through which a portion of the outer surface of the head is visible.

7. The drill guide of claim 1, wherein the head comprises a projection limiting rotation of the collar about the head.

8. A tool comprising:
 the drill guide of claim 1;
 a base for supporting a patella; and
 a handle comprising levers operable to move the guide and the base relative to each other.

9. The tool of claim 8, wherein either or both of the drill guide and the base are releasably connected to the levers.

10. The tool of claim 8, wherein the base includes a ring-shaped block.

11. The tool of claim 8, wherein the handle is operable to move the drill guide and the base in parallel directions without causing the drill guide and the base to rotate relative to one another.

12. A kit comprising:
 the patella drill guide of claim 1; and
 a cut guide including a planar guide surface and being removably connectable to the head at a position where the planar guide surface is normal to a central axis of the at least one channel.

13. The kit of claim 12, wherein the cut guide is adjustable to cause the planar guide surface to translate parallel to the central axis of the at least one channel.

14. A method of preparing a patella for receiving a patellar implant, the method comprising:
 clamping the patella between a drill guide and a base, the drill guide including a bearing end and a collar forming a ball-and-socket joint so that the drill guide contacts the patella through the collar on a resected surface of the patella created by a resection of a first portion of the patella; and
 drilling holes in the patella through the drill guide.

15. The method of claim 14, further comprising:
 cutting the patella to remove a second portion of the patella after drilling the holes in the patella.

16. The method of claim 15, wherein the drilling is performed by directing a drill through holes in a removable insert received in a bore of the drill guide and cutting the patella to remove the second portion of the patella includes directing a reamer through the bore.

17. The method of claim 15, wherein cutting the patella to remove the second portion of the patella includes directing a reamer against the patella while a guide peg that extends from a cutting face of the reamer is received in one of the holes drilled in the patella.

18. The method of claim 15, further comprising attaching a corrective resection guide to the drill guide and wherein cutting the patella to remove the first portion of the patella includes directing a cutting tool along a resection guide surface of the corrective resection guide.

19. A kit comprising:
 a patella drill guide including:
 a head having an outer surface, the outer surface being convexly curved, and at least one channel extending through the head; and
 a collar having an inner surface being concavely curved and corresponding in shape to at least a portion of the outer surface of the head and being fitted to the head to define an articular joint therebetween; and
 a cut guide including a planar guide surface and being removably connectable to the head at a position where the planar guide surface is normal to a central axis of the at least one channel.

* * * * *